United States Patent
Lu et al.

(10) Patent No.: US 11,582,729 B2
(45) Date of Patent: Feb. 14, 2023

(54) METHOD FOR DATA TRANSMISSION IN SIDELINK AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/144,864

(22) Filed: Jan. 8, 2021

(65) Prior Publication Data

US 2021/0136744 A1    May 6, 2021

Related U.S. Application Data

(63) Continuation of application No. PCT/CN2019/072052, filed on Jan. 16, 2019.

(30) Foreign Application Priority Data

Jul. 17, 2018  (WO) ............... PCT/CN2018/095961
Jul. 20, 2018  (WO) ............... PCT/CN2018/096531
Nov. 8, 2018  (WO) ............... PCT/CN2018/114613

(51) Int. Cl.
*H04W 72/04*    (2009.01)
(52) U.S. Cl.
CPC ............... *H04W 72/0406* (2013.01)
(58) Field of Classification Search
CPC ................................ H04W 72/0406
See application file for complete search history.

(56) References Cited

U.S. PATENT DOCUMENTS

2017/0006586 A1\*  1/2017  Gulati ............. H04W 72/042
2018/0234888 A1    8/2018  Yasukawa et al.
(Continued)

FOREIGN PATENT DOCUMENTS

CN    106470492 A    3/2017
CN    107659965 A    2/2018
(Continued)

OTHER PUBLICATIONS

3GPP TSG RAN WG1 Meeting #95, Spokane, USA, Nov. 12-16, 2018—R1-1812209—Huawei, HiSilicon, Sidelink resource allocation mode 2 (14 pages).
(Continued)

*Primary Examiner* — Jasper Kwoh
(74) *Attorney, Agent, or Firm* — Perkins Coie LLP

(57) ABSTRACT

A method for data transmission in a sidelink includes: a first terminal device selecting a first resource from a data resource pool in a selection window, the first resource being used for sending data of the first terminal device; the first terminal device selecting, from a control resource pool in the selection window, a second resource for sending first indication information, the first indication information being used for indicating the first resource, the positions of the first resource and the second resource in a time domain and/or frequency domain being different; and the first terminal device sending the first indication information over the second resource, and sending the data of the first terminal device over the first resource.

10 Claims, 7 Drawing Sheets

(56) References Cited

U.S. PATENT DOCUMENTS

| | | | |
|---|---|---|---|
| 2018/0376474 A1* | 12/2018 | Khoryaev | H04W 76/14 |
| 2019/0007974 A1* | 1/2019 | Nguyen | H04W 4/44 |
| 2019/0075546 A1* | 3/2019 | Yasukawa | H04W 92/18 |
| 2019/0132818 A1* | 5/2019 | Yasukawa | H04W 72/08 |
| 2019/0163531 A1* | 5/2019 | Yue | H04W 72/02 |
| 2019/0387377 A1* | 12/2019 | Zhang | H04W 4/44 |
| 2020/0008025 A1* | 1/2020 | Lee | H04W 4/06 |
| 2020/0221423 A1* | 7/2020 | Wang | H04W 74/0808 |
| 2020/0275458 A1* | 8/2020 | Khoryaev | H04W 4/44 |
| 2020/0288431 A1* | 9/2020 | Lee | H04W 72/0446 |

FOREIGN PATENT DOCUMENTS

| | | | |
|---|---|---|---|
| CN | 107710705 A | 2/2018 | |
| CN | 107736062 A | 2/2018 | |
| CN | 107889158 A | 4/2018 | |
| CN | 107889161 A | 4/2018 | |
| EP | 3445107 A1 | 2/2019 | |
| JP | 2017505054 A | 2/2017 | |
| WO | 2017026545 A1 | 2/2017 | |
| WO | 2017049937 A1 | 3/2017 | |
| WO | 2017077976 A1 | 5/2017 | |
| WO | 2017084514 A1 | 5/2017 | |
| WO | 2017169835 A1 | 10/2017 | |
| WO | 2017179286 A1 | 10/2017 | |
| WO | 2018027823 A1 | 2/2018 | |

OTHER PUBLICATIONS

3GPP TSG RAN WG1 Meeting #95, Spokane, USA, Nov. 12-16, 2018—R1-1812733—ZTE, Sanechips, Analysis of Mode 2 resource schemes on sidelink (6 pages).

3GPP TSG RAN WG1 Meeting #95, Spokane, USA, Nov. 12-16, 2018—R1-1812987—Samsung, Discussion on Resource Allocation Mechanisms for NR V2X (7 pages).

3GPP TSG RAN1 Meeting #95, Spokane, USA, Nov. 12-16, 2018—R1-1812620—CATT, Discussion on resource allocation mechanism in NR V2X (9 pages).

3GPP TSG-RAN WG1 Meeting #95, Spokane, WA, US, Nov. 12-16, 2018—R1-1813641—Ericsson, On Mode 2 Resource Allocation for NR Sidelink (16 pages).

International Search Report dated Apr. 16, 2019 of PCT/CN2019/072052 (4 pages).

International Search Report dated Feb. 27, 2019 of PCT/CN2018/114613 (4 pages).

International Search Report dated Mar. 27, 2019 of PCT/CN2018/096531 (4 pages).

EPO, Extended European Search Report for European Application No. 19838276.4, dated Jul. 14, 2021. 9 pages.

IP Australia, Examination Report No. 1 for Australian Application No. 2019303436, dated Aug. 5, 2021. 3 pages.

Examination Report for European Application No. 19838276.4 dated Feb. 22, 2022. 7 pages.

Examination Report for Indian Application No. 202117003269 dated Jan. 6, 2022. 6 pages with English translation.

Examination Report No. 2 for Australian Application No. 2019303436 dated Jan. 11, 2022. 3 pages.

First Examiner's Report for Canadian Application No. 3106043 dated Jan. 11, 2022. 5 pages.

Intel Corp. "Remaining Details of Reduced Resource Selection Time for LTE V2V Sidelink Communication" R1-1806485; 3GPP TSG RAN WG1 Meeting #93; Busan, Korea; May 21-25, 2018. 5 pages.

Notice of Reasons for Refusal for Japanese Application No. 2021-500136 dated Mar. 8, 2022. 10 pages with English translation.

Examination Report for European Application No. 19838276.4 dated Jun. 9, 2022. 6 pages.

Examination Report No. 3 for Australian Application No. 2019303436 dated Apr. 28, 2022. 3 pages.

First Office Action for Chinese Application No. 202110139554 dated Jul. 15, 2022. 14 pages with English translation.

Decision of Refusal for Japanese Application No. 2021-500136 dated Sep. 13, 2022. 6 pages with English translation.

Examination Report for European Application No. 19838276.4 dated Nov. 9, 2022.

Examiner's Report for Canadian Application No. 3106043 dated Sep. 15, 2022. 4 pages.

Request for Submission of an Opinion for Korean Application No. 10-2021-7001067 dated Oct. 26, 2022. 16 pages with English translation.

* cited by examiner

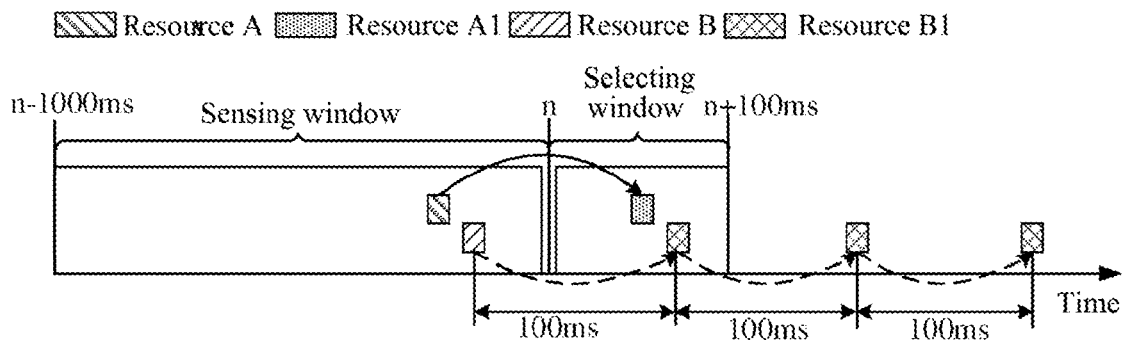

FIG. 5A

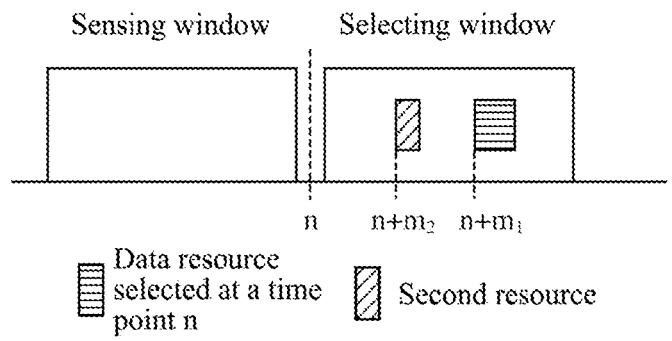

| 610 | A first terminal device selects a first resource from a data resource pool within a selecting window, wherein the first resource is used for sending data of the first terminal device. |

| 620 | The first terminal device selects a second resource used for sending first indication information from a control resource pool within the selecting window, wherein, the first indication information is used for indicating the first resource, and positions of the first resource and the second resource are different in time domain and/or frequency domain. |

| 630 | The first terminal device sends the first indication information on the second resource, and sends the data of the first terminal device on the first resource. |

FIG. 6

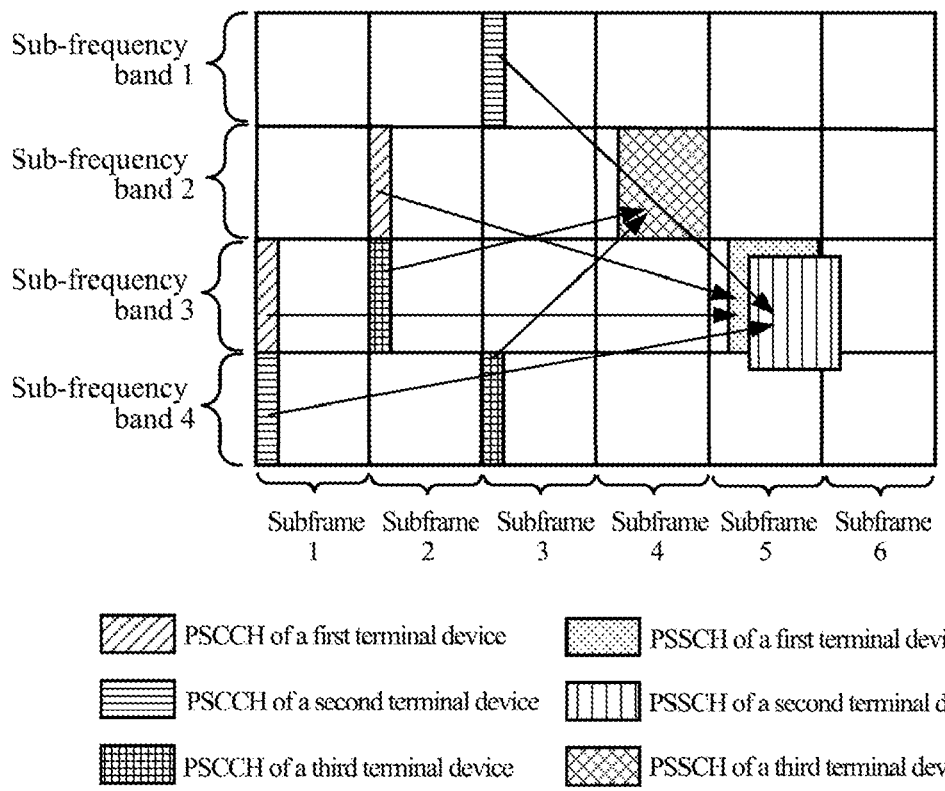

| 910: A first terminal device selects multiple first resources from a data resource pool within a selecting window, wherein the multiple first resources may be used for sending data of the first terminal device. |

| 920: The first terminal device selects a second resource used for sending first indication information from a control resource pool within the selecting window, wherein the first indication information is used for indicating the multiple first resources, and positions the multiple first resources and the second resource are different in time domain and/or frequency domain. |

| 930: The first terminal device sends the first indication information on the second resource, and sends the data of the first terminal device on at least partial first resources of the multiple first resources, wherein the data is sent once on each first resource in the at least partial first resources. |

FIG. 9

METHOD FOR DATA TRANSMISSION IN SIDELINK AND TERMINAL DEVICE

CROSS-REFERENCE TO RELATED APPLICATION

The present application is a continuation application of PCT Patent Application No. PCT/CN2019/072052, filed on Jan. 16, 2019, which claims priorities to PCT patent application No. PCT/CN2018/095961 filed to China Patent Office on Jul. 17, 2018, entitled "Method for Transmitting Data in a Sidelink and Terminal Device", PCT patent application No. PCT/CN2018/096531 filed to China Patent Office on Jul. 20, 2018, entitled "Method for Transmitting Data in a Sidelink and Terminal Device", and PCT patent application No. PCT/CN2018/114613 filed to China Patent Office on Nov. 8, 2018, entitled "Method for Transmitting Data in a Sidelink and Terminal Device". The present application claims priority and the benefit of the above-identified applications, and the above-identified applications are incorporated by reference herein in their entireties.

TECHNICAL FIELD

Implementations of the present disclosure relate to the field of communication, and more specifically, to a method for transmitting data in a sidelink and a terminal device.

BACKGROUND

A Vehicle-to-Everything (V2X) communication system is a Sidelink (SL) transmission technology based on D2D communication. Different from a traditional Long Term Evolution (LTE) system in which data is received or sent through a base station, the vehicle to everything system uses a mode of terminal-to-terminal direct communication, therefore it has a higher spectrum efficiency and a lower transmission delay. In the vehicle to everything, a terminal device may independently select a transmission resource of a sidelink. For example, the terminal device may randomly select the resource or determine the resource by sensing.

In an LTE system, a service has periodicity, and the terminal device may predict an arrival time of a next service. Therefore, other users may be prevented from occupying this resource by reserving resources, so as to achieve a purpose of avoiding resource conflicts. Specifically, the terminal device may carry its reserved resource in Sidelink Control Information (SCI), and the sidelink control information and data resources of the terminal device are frequency-divided. However, in an NR system, services usually do not have periodicity. For example, services may arrive randomly, or an arrival time of a service may be within a certain time range. Therefore, when the service of the terminal device does not have periodicity, how to avoid a resource conflict becomes an urgent problem to be solved.

SUMMARY

Implementations of the present disclosure provide a method for transmitting data in a sidelink and a terminal device, by which resource conflicts can be avoided when aperiodic services are transmitted.

In a first aspect, a method for transmitting data in a sidelink is provided, including: selecting, by a first terminal device, a first resource from a data resource pool within a selecting window, wherein the first resource is used for sending data of the first terminal device; selecting, by the first terminal device, a second resource used for sending first indication information from a control resource pool within the selecting window, wherein the first indication information is used for indicating the first resource, and positions of the first resource and the second resource are different in time domain and/or frequency domain; sending, by the first terminal device, the first indication information on the second resource, and sending the data of the first terminal device on the first resource.

In a second aspect, a method for transmitting data in a sidelink is provided, including: selecting, by a first terminal device, multiple first resources from a data resource pool within a selecting window, wherein the multiple first resources may be used for sending data of the first terminal device; selecting, by the first terminal device, a second resource used for sending first indication information from a control resource pool within the selecting window, wherein the first indication information is used for indicating the multiple first resources, and positions of the multiple first resources and the second resource are different in time domain and/or frequency domain; sending, by the first terminal device, the first indication information on the second resource, and sending the data of the first terminal device on at least partial first resources of the multiple first resources, wherein the data is sent once on each first resource in the at least partial first resources.

In a third aspect, a terminal device is provided. The terminal device may perform the method in the above first aspect or any optional implementation of the first aspect. Specifically, the terminal device may include function modules for performing the method in the above first aspect or any possible implementation of the first aspect.

In a fourth aspect, a terminal device is provided. The terminal device may perform the method in the above second aspect or any optional implementation of the second aspect. Specifically, the terminal device may include function modules for implementing the method in the above second aspect or any possible implementation of the second aspect.

In a fifth aspect, a terminal device is provided, including a processor and a memory. The memory is configured to store a computer program, and the processor is configured to call and run the computer program stored in the memory to execute the method in the above first aspect or any possible implementation of the first aspect.

In a sixth aspect, a terminal device is provided, including a processor and a memory. The memory is configured to store a computer program, and the processor is configured to call and run the computer program stored in the memory to execute the method in the above second aspect or any possible implementation of the second aspect.

In a seventh aspect, a chip is provided, configured to implement the method in the above first aspect or any possible implementation of the first aspect. Specifically, the chip includes a processor, configured to call and run a computer program from a memory, so that a device provided with the chip performs the method in the above first aspect or any possible implementation of the first aspect.

In an eighth aspect, a chip is provided, configured to implement the method in the above second aspect or any possible implementation of the second aspect. Specifically, the chip includes a processor, configured to call and run a computer program from a memory, so that a device provided with the chip performs the method in the above second aspect or any possible implementation of the second aspect.

In a ninth aspect, a computer readable storage medium is provided, configured to store a computer program, wherein the computer program enables a computer to perform the method in the above first aspect or any possible implementation of the first aspect.

In a tenth aspect, a computer readable storage medium is provided, configured to store a computer program, wherein the computer program enables a computer to perform the method in the above second aspect or any possible implementation of the second aspect.

In an eleventh aspect, a computer program product is provided, including computer program instructions, wherein the computer program instructions enable a computer to perform the method in the above first aspect or any possible implementation of the first aspect.

In a twelfth aspect, a computer program product is provided, including computer program instructions, wherein the computer program instructions enable a computer to perform the method in the above second aspect or any possible implementation of the second aspect.

In a thirteenth aspect, a computer program is provided, which, when being run on a computer, enables the computer to perform the method in the above first aspect or any possible implementation of the first aspect.

In a fourteenth aspect, a computer program is provided, which, when being run on a computer, enables the computer to perform the method in the above second aspect or any possible implementation of the second aspect.

According to the above technical solution, when a service of a terminal device does not have periodicity, the terminal device sends, before a data transmission resource used for sending data, indication information indicating the data transmission resource, so that another terminal device can know that the terminal device has reserved the data transmission resource, thus avoiding a resource conflict occurring during data transmission as much as possible.

BRIEF DESCRIPTION OF DRAWINGS

FIG. 5A is a schematic diagram of resource sensing and selection.

FIG. 5B is a schematic diagram of resource sensing according to an implementation of the present disclosure.

FIG. 6 is a schematic flowchart of a method for transmitting data in a sidelink according to an implementation of the present disclosure.

FIG. 8 is a schematic diagram of control channel resources and data channel resources according to an implementation of the present disclosure.

FIG. 9 is a schematic flowchart of a method for transmitting data in a sidelink according to another implementation of the present disclosure.

DETAILED DESCRIPTION

Technical solutions in implementations of the present disclosure are described below with reference to the accompanying drawings.

It should be understood that, the technical solutions of the implementations of the present disclosure may also be applied to various communications systems, for example, a Global System for Mobile communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a Long Term Evolution (Long Term Evolution, LTE) system, an LTE frequency division duplex (Frequency Division Duplex, FDD) system, LTE time division duplex (Time Division Duplex, TDD), a universal mobile telecommunication system (Universal Mobile Telecommunication System, UMTS) system, and a future 5G communications system.

The present disclosure describes various implementations with reference to a terminal device. The terminal device may be a User Equipment (UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, a terminal device in a future evolved public land mobile network (Public Land Mobile Network, PLMN), or the like.

The present disclosure describes various implementations with reference to a network device. A network device may be a device for communicating with a terminal device, such as a base station (Base Transceiver Station, abbreviated as BTS) in a GSM system or CDMA, a base station (NodeB, abbreviated as NB) in a WCDMA system, or an evolved base station (Evolutional Node B, abbreviated as eNB or eNode B) in an LTE system, or the network device may be a relay station, an access point, a vehicle-mounted device, a wearable device, a network side device in a future 5G network, or a network side device in a future evolved PLMN network, etc.

Figure 1:
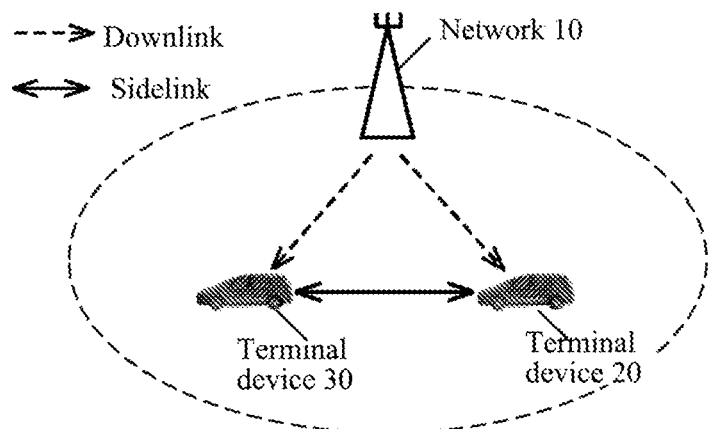
FIG. 1 is a schematic diagram of architecture of an application scenario according to an implementation of the present disclosure.
Figure 2:
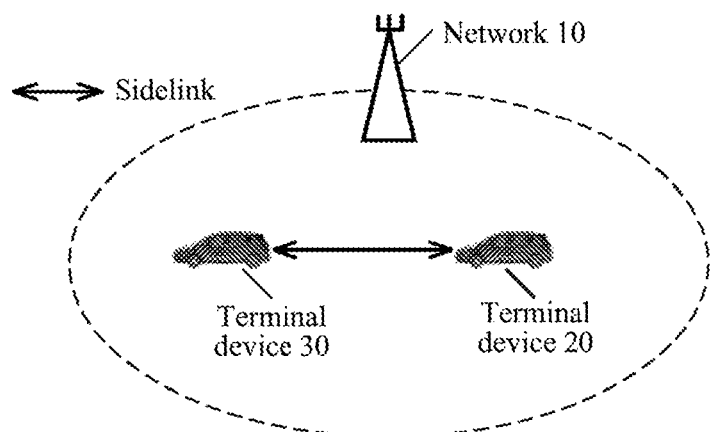
FIG. 2 is a schematic diagram of architecture of another application scenario according to an implementation of the present disclosure.

FIGS. 1 and 2 are schematic diagrams of a possible application scenario according to implementations of the present disclosure. FIG. 1 exemplifies one network device and two terminal devices. Optionally, the wireless communication system may include multiple network devices, and another number of terminal devices may be included within a coverage area of each network device, which is not restricted in implementations of the present disclosure. In addition, the wireless communication system may also include other network entities, such as a Mobile Management Entity (MME), a Serving Gateway (S-GW), a Packet Data Network Gateway (P-GW), and the implementations of the present disclosure are not limited thereto.

Specifically, a first terminal device and a second terminal device may communicate in a D2D communication mode, and when performing D2D communication, the first terminal device and the second terminal device directly communicate through a D2D link, that is, a Sidelink (SL). For example, as shown in FIG. 1 or FIG. 2, the first terminal device and the second terminal device directly communicate through a sidelink. In FIG. 1, the first terminal device and the second terminal device communicate via a sidelink, and their transmission resources are allocated by a network device. In FIG. 2, the first terminal device and the second terminal device communicate through a sidelink, and their transmission resources are autonomously selected by the terminal devices, and the network device does not need to allocate transmission resources.

D2D communication may refer to vehicle to vehicle (V2V) communication or vehicle to everything (V2X) communication. In the V2X communication, X may generally refer to any device with wireless receiving and sending capabilities, such as but not limited to a wireless device that moves slowly, a vehicle-mounted device that moves fast, or a network control node with wireless transmitting and receiving capabilities. It should be understood that implementations of the present disclosure are mainly applied to a V2X communication scenario, but they may also be applied to any other D2D communication scenario, which is not restricted in implementations of the present disclosure.

There are two transmission modes defined in the vehicle to everything, namely, a transmission mode 3 (mode 3) and a transmission mode 4 (mode 4). A transmission resource of a terminal device in the transmission mode 3 (referred to as mode 3 for short) is allocated by a base station. The terminal device sends data on a sidelink according to the resource allocated by the base station, and the base station may allocate, to the terminal device, a resource for a single transmission or a resource for semi-static transmission. A terminal device in the transmission mode 4 (referred to as mode 4 for short) transmits data by means of sensing and reservation if it has a sensing capability, and randomly selects a transmission resource from a resource pool if it does not have the sensing capability. The terminal device having the sensing capability acquires a set of available transmission resources from a resource pool by sensing, and the terminal device randomly selects one resource from the set for data transmission. Since services in a vehicle to everything system have a periodicity characteristic, the terminal device usually adopts a semi-static transmission mode, that is, after selecting one transmission resource, the terminal device will continuously use the resource in multiple transmission periods, thus reducing probabilities of resource re-selection and resource conflicts. The terminal device will carry, in control information for a current transmission, information about a resource reserved for a next transmission, so that another terminal device may determine whether this block of resource is reserved and used by the terminal device through detecting control information of the terminal device, thus achieving a purpose of reducing resource conflicts.

In a vehicle to everything system of LTE, when a terminal device transmits data, data and corresponding resource scheduling information are transmitted by using a mode of Frequency Division Multiplexing (FDM). Specifically, a resource pool for transmitting resource scheduling information and a resource pool for transmitting data have two configuration modes, i.e., adjacent and non-adjacent in frequency domain.

Figure 3:
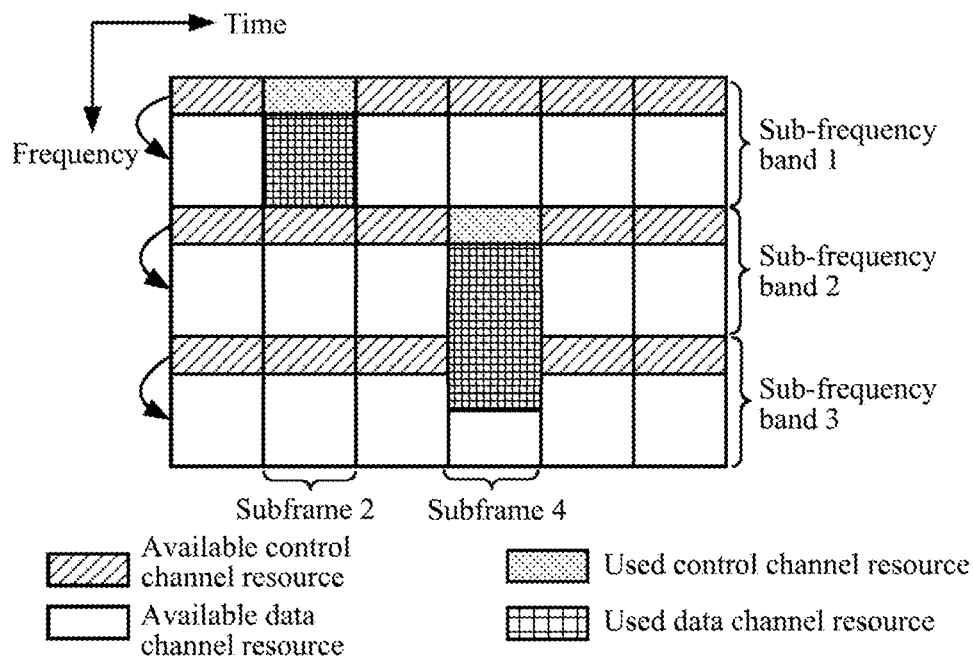
FIG. 3 is a resource diagram of control channel resources and data channel resources being adjacent in frequency domain in an LTE system.

For example, for a case of being adjacent in frequency domain as shown in FIG. 3, control channel resources for transmitting resource scheduling information and data channel resources for transmitting a data channel are adjacent in the frequency domain, and a whole system bandwidth uses a sub-frequency band (also referred to as sub-bands for short) as granularity, wherein each sub-frequency band contains multiple continuous Physical Resource Blocks (PRBs), a first PRB and a second PRB in each sub-frequency band may be used to transmit resource scheduling information (i.e., control channel resources occupy two adjacent PRBs in the sub-frequency band in frequency domain), remaining PRBs are available data channel resources, the data channel resources and the control channel resources have one-to-one correspondence, and starting positions of the data channel resources are decided by positions of their corresponding control channel resources. The data channel resources may occupy one sub-frequency band (for example, the data channel resources used by the terminal device shown on a subframe 2 occupy a sub-frequency band 1), or may span multiple sub-frequency bands (for example, the data channel resources used by the terminal device shown on a subframe 4 occupy a sub-frequency band 2 and a sub-frequency band 3). When data channel resources occupy multiple sub-frequency bands, the data channel resources are continuous in the frequency domain within multiple sub-frequency bands, and may occupy control channel resources within another sub-frequency band, and the control channel resources corresponding to the data channel resources are located in control channel resources in a first sub-frequency band where the data channel resources are located. For example, the data channel resources shown in a subframe 4 in FIG. 3 occupy two adjacent sub-frequency bands (the sub-frequency band 2 and the sub-frequency band 3), and their corresponding control channel resources are within control channel resources of a first sub-frequency band (the sub-frequency band 2) in these two sub-frequency bands.

Figure 4:
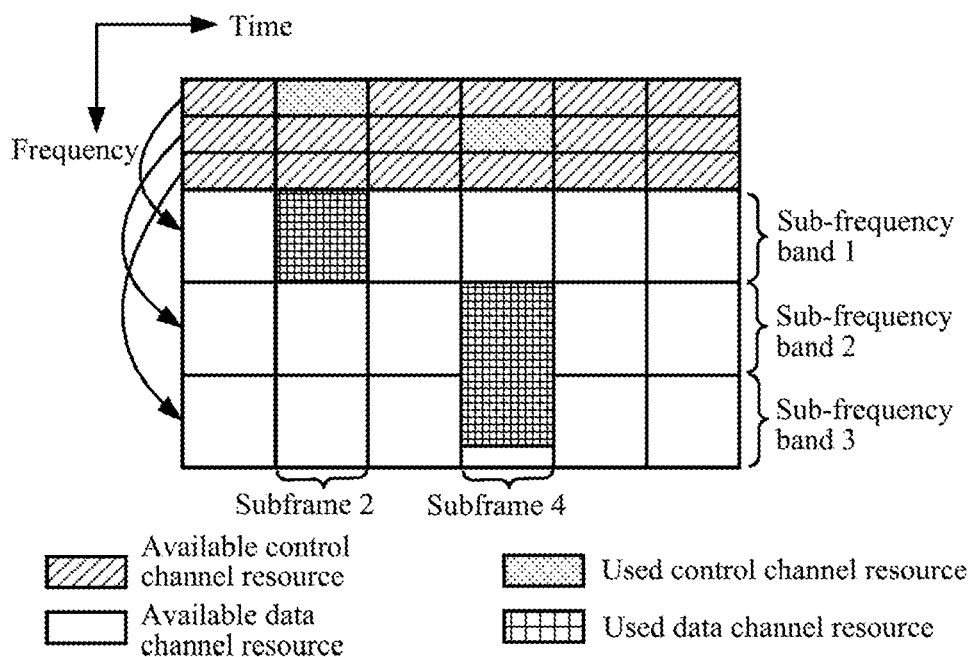
FIG. 4 is a resource diagram of control channel resources and data channel resources being not adjacent in frequency domain in an LTE system.

For example, for a case of being non-adjacent in the frequency domain as shown in FIG. 4, the control channel resources and their corresponding data channel resources are not adjacent in the frequency domain, and the data channel resources and the control channel resources are independently configured. However, positions of the data channel resources and positions of the control channel resources have one-to-one correspondence, and starting positions of the data channel resources may be decided by positions of their corresponding control channel resources.

The data channel resources may occupy one sub-frequency band (for example, the data channel resources used by the terminal device shown on a subframe 2 occupy a sub-frequency band 1), or may occupy multiple sub-frequency bands (for example, the data channel resources used by the terminal device shown on a subframe 4 occupy a sub-frequency band 2 and a sub-frequency band 3). When the data channel resources occupy multiple sub-frequency bands, data channels are continuous in the frequency domain within multiple sub-frequency bands, wherein resource scheduling information corresponding to the data channels is located in a control channel resource corresponding to the first sub-frequency band. For example, the data channel shown on a subframe 4 of FIG. 4 occupies two adjacent sub-frequency bands (the sub-frequency band 2 and the sub-frequency band 3), and resource scheduling information corresponding to the data channel is located within the control channel resource corresponding to the first sub-frequency band (the sub-frequency band 2).

In the vehicle to everything system of LTE, a terminal device may perform a method shown in FIG. 5A when performing resource sensing, for example. Herein, in each sidelink process (one carrier may include two processes), when a new data packet arrives near a time point n, the terminal device needs to select or reselect a resource, and the terminal device selects a resource in a time interval [n+$T_A$, n+$T_B$] ms according to a sensing result for a previous is (i.e., 1000 ms) sensing window, wherein this [n+$T_A$, n+$T_B$] ms time period is referred to as a selecting window, wherein $T_A$ and $T_B$ may, for example, satisfy $T_A \leqslant 4$, $20 \leqslant T_B \leqslant 100$. The first is described later all refers to a first is with reference to a time point n. A specific resource selection process is as follows. Here, taking the first terminal device and the second terminal device shown in FIG. 2 as examples, a process of sensing and resource selection by the first terminal device is described.

(0) It is assumed that all resources within a selecting window constitute a candidate resource set S_A, and the number of resources in the original candidate resource set S_A is A.

(1) If there is no sensing result on a certain subframe within a sensing window, and another reserved subframe distributed according to a certain transmission period with reference to the subframe falls within the selecting window, then resources on the another subframe within the selecting window are excluded from the candidate resource set S_A, and resources on a subframe where a transmission resource reserved by the first terminal device for itself according to a certain transmission period is located may also be excluded from the candidate resource set S_A. The transmission period may be an element in a transmission period set, wherein the transmission period set may be {20, 50, 100, 200, 300, 400, 500, 600, 700, 800, 900, 1000} ms, for example. For example, as shown in FIG. 5A, if a terminal 20 has no sensing result on a resource A within the sensing window, and a resource on a next transmission period corresponding to the resource A is a resource A1 within the selecting window, then the terminal 20 excludes the resource A1 from the candidate resource set S_A.

(2) If the first terminal device detects a Physical Sidelink Control Channel (PSCCH) sent by the second terminal device within the first is of the sensing window, and a measured value of a Reference Signal Received Power (RSRP) of a Physical Sidelink Shared Channel (PSSCH) corresponding to the PSCCH is higher than a PSSCH-RSRP threshold, and the detected PSCCH indicates that the second terminal device sending the PSCCH has reserved a time-frequency resource needed by a subsequent transmission (for example, in FIG. 5A, time-frequency resources reserved by the second terminal device are time-frequency resources B1 corresponding to a resource B within the sensing window and located at time-domain positions such as 100 ms, 200 ms, 300 ms, . . . , etc. behind the resource B), then the first terminal device may determine whether a time-frequency resource reserved by the second terminal device within the selecting window, overlaps (including completely or partially overlapping) with a time-frequency resource selected by itself for transmitting data within the selecting window (for example, in FIG. 5A, a time-frequency resource reserved by the first terminal device is a time-frequency resources A1 corresponding to a resource A within the sensing window and located behind the resource A). If overlapping, that is, there is a resource conflict, then the first terminal device excludes the time-frequency resource within the selecting window from the candidate resource set S_A. At this time, it is assumed that the number of resources remaining in the candidate resource set S_A is equal to B.

It should be understood that if the first terminal device selects the time-frequency resource used for transmitting data for itself within the selecting window, and needs to transmit data on all the multiple time-frequency resources distributed according to a time period $T_{20}$, then at this time, if the second terminal device reserves the multiple time-frequency resources distributed according to a time period $T_{30}$, and the time period $T_{20}$ satisfies $T_{20} \times M = T_{30} \times N$, wherein M and N are positive integers, then the first terminal device will exclude the multiple time-frequency resources distributed according to the time period $T_{20}$ from the candidate resource set.

(3) If the number B of remaining resources in the candidate resource set S_A is less than A×20%, the first terminal device may increase a PSSCH-RSRP threshold by 3 dB, and repeat acts (0) to (2) until B $\geqslant$ A×20%.

In an implementation of the present disclosure, the finally obtained PSSCH-RSRP threshold is a PSSCH-RSRP threshold corresponding to a carrier where the sidelink process is located.

(4) The first terminal device measures Sidelink Received Signal Strength Indicators (S-RSSI) of remaining B resources in the candidate resource set S_A, and sorts them from high to low according to a measurement result, and moves the A×20% resources with a lowest signal strength to a candidate resource set S_B.

(5) The first terminal device selects a time-frequency resource in the candidate resource set S_B with equal probability for data transmission.

It should be understood that here a time-frequency resource occupied by a data channel corresponding to a certain control channel is referred to as a time-frequency resource (or a resource block) for transmitting the data channel, and multiple time-frequency resources used for transmitting the data channel may exist in a candidate resource set within each selecting window. For example, the resources A1 and B1 in FIG. 5A may both be referred to as a time-frequency resource.

After the first terminal device selects the time-frequency resource used for data transmission, it may continuously use the time-frequency resource in each transmission period of the subsequent transmission process, and use the time-frequency resource C_resel times in total, wherein the C_resel is a Resource Reselection Counter, and a value of the C_resel is reduced by 1 every time data is transmitted. When the value of the C_resel is reduced to 0, the first terminal device may generate a random number between [0, 1], and compare it with a Probability Resource Keep parameter, wherein the parameter indicates a probability that the terminal device continues to use the resource. If the value of the random number is greater than the parameter, the first terminal device reselects a resource. If the value of the random number is less than the parameter, the first terminal device may continue to use the time-frequency resource for data transmission, and reset the value of the C_resel at the same time.

It may be seen from the above that, since the service in the LTE has periodicity, and the terminal device may predict an arrival time of a next service, other users may be prevented from occupying this resource by reserving resources, thus achieving a purpose of avoiding conflict. However, in an NR system, services usually do not have periodicity. For example, services may arrive randomly; or, an arrival time of a service may be an average plus a random quantity. For example, an average arrival time of services is 100 ms, but there may be a certain deviation around 100 ms. If the random quantity is [−20, 20] ms, the arrival time of the service may be between 80 ms and 120 ms.

Therefore, an implementation of the present disclosure proposes that when a service of a terminal device does not have periodicity, the terminal device sends, before a data transmission resource used for transmitting data, indication information indicating the data transmission resource, so that another terminal device can know that the terminal device has reserved the data transmission resource, thus avoiding a resource conflict occurring during data transmission as much as possible.

FIG. 6 is a schematic flowchart of a method for transmitting data in a sidelink according to an implementation of the present disclosure. The method shown in FIG. 6 may be performed by a terminal device. The terminal device may be, for example, the terminal device 20 or the terminal device 30 shown in FIG. 2. As shown in FIG. 6, the method for transmitting data in a sidelink includes following acts 610-630.

In 610, the first terminal device selects a first resource from a data resource pool within a selecting window, wherein the first resource is used for sending data of the first terminal device.

In 620, the first terminal device selects a second resource used for sending first indication information from a control resource pool within the selecting window.

Herein, the first indication information is used for indicating the first resource, and positions of the first resource and the second resource are different in time domain and/or frequency domain.

In 630, the first terminal device sends the first indication information on the second resource, and sends the data of the first terminal device on the first resource.

An implementation of the present disclosure does not restrict an order for performing 610 and 620. 610 may be performed before 620, or 620 may be performed before 610, or 610 and 620 may be performed at the same time.

In a case, there is no corresponding relationship between resources in the data resource pool and resources in the control resource pool. A first resource selected by the first terminal device for sending data and a second resource used for sending first indication information may not have a certain specific relationship on a time-frequency position. For example, the first resource and the second resource may not be in a same subframe or time slot, and a starting position of the first resource may not be decided by a position of its corresponding second resource. The first terminal device may independently select the second resource and the first resource. The first terminal device may not depend on a position of the second resource when selecting the first resource. Similarly, the terminal device may not depend on a position of the first resource when selecting the second resource. After the first terminal device selects the first resource, information of the first resource is indicated through the first indication information, so that another terminal device which detects the first indication information may know that the first terminal device has reserved the first resource for data transmission, and thus a resource conflict can be avoided.

In this case, optionally, in 620, the first terminal device selects the second resource used for sending the first indication information from the control resource pool within the selecting window, including: the first terminal device randomly selects the second resource from the control resource pool within the selecting window. Herein, the first terminal device may randomly select one or more resources from the control resource pool within the selecting window as the second resource.

Or, optionally, in 620, the first terminal device selects the second resource used for sending the first indication information from the control resource pool within the selecting window, including: the first terminal device selects the second resource within a first time range within the selecting window, wherein the first time range is predefined by a protocol or configured by a network. Further, the first time range is a time range before a starting time point of the first resource. For example, the first terminal device performs resource selection at a time point n, and selects a resource at a time point n+k1 as the first resource, and the first terminal device selects the second resource within the first time range [n+p, n+q], wherein n is a time point when resource selection starts, and the parameter p or q is predefined by the protocol or configured by the network, for example, p=0 and q=5. Optionally, the parameter q configured by the network is an integer less than n+k1. In this way, the terminal device selects the second resource within the first time range [n+p, n+q], so that the first indication information may be sent in time.

In another case, there is a corresponding relationship between resources in the data resource pool and resources in the control resource pool.

In this case, optionally, in 620, the first terminal device selects the second resource used for sending the first indication information from the control resource pool within the selecting window, including: the first terminal device selects the second resource from at least one resource corresponding to the first resource in the control resource pool.

It should be understood that a corresponding relationship between data resources in the data resource pool and control resources in the control resource pool may be that one data resource corresponds to one control resource, one data resource corresponds to multiple control resources, or multiple data resources correspond to one control resource, and this is not limited here. First indication information sent on each control resource in a control resource pool may be used for indicating a data resource corresponding to the control resource. Or, each data resource in a data resource pool may be indicated by first indication information carried on a control resource corresponding to the data resource.

After the first terminal device selects the first resource, it may select a second resource used for sending first indication information according to the corresponding relationship between the resources in the data resource pool and the resources in the control resource pool. For example, when the number of resources corresponding to the first resource in the control resource pool is 1, the first terminal device selects the resource corresponding to the first resource in the control resource pool as the second resource. For another example, when there are multiple resources corresponding to the first resource in the control resource pool, a resource may be randomly selected from the multiple resources as the second resource, and the first indication information may be sent on the second resource to indicate the first resource. For another example, when there are multiple resources corresponding to the first resource in the control resource pool, the multiple resources may all be used as the second resource, that is, the second resource include multiple resources, wherein each resource is used for bearing the first indication information. For another example, when there are multiple resources corresponding to the first resource in the control resource pool, two resources with different positions in time domain may be arbitrarily selected from the multiple resources, and the two resources are both used as the second resource, that is, the second resource includes two resources, wherein each resource is used for bearing the first indication information.

The corresponding relationship between the resources in the data resource pool and the resources in the control resource pool may be preconfigured, for example, preset by a protocol; it may also be configured by the network device, and notified to the terminal device through broadcast information, Radio Resource Control (RRC) signaling, or control signaling.

The selecting window is a time range after a time point when the first terminal device selects a resource.

The selecting window may, for example, refer to the selecting window shown in FIG. 5A, a data resource pool and a control resource pool may be included within the selecting window, resources in the data resource pool are used for transmitting a data channel, the first terminal device may select, in the data resource pool, a resource for transmitting its PSSCH, the control resource pool is used for transmitting a control channel, and the first terminal device may select, in the control resource pool, a resource for transmitting its PSCCH.

Optionally, the selecting window may be determined according to a first parameter of data to be transmitted by the first terminal device, wherein the first parameter includes, for example, at least one of following: a delay requirement of the data, a service transmission period, and a maximum number of retransmissions.

Optionally, the second resource is located before the first resource.

That is, the first resource and the second resource are time-divided. For example, before sending a PSSCH, the first terminal device may send a PSCCH corresponding to the PSSCH, and indicate a resource for sending the PSSCH through first indication information carried in an SCI carried in the PSCCH.

An implementation of the present disclosure does not limit a form of the first indication information. For example, the first indication information may be information carried in the SCI, or the first indication information may be a preamble sequence, or referred to as a preemption. Optionally, when the first indication information is a preamble sequence, different preamble sequences have a one-to-one correspondence with different PSSCH resources. Based on the preamble sequence sent by the first terminal device, the position of the resource reserved by the first terminal device for sending its PSSCH may be known.

Optionally, in 610, the first terminal device selects the first resource from the data resource pool within the selecting window, including: the first terminal device performs resource sensing, and selects the first resource from the data resource pool according to a result of the resource sensing.

For example, the first terminal device may perform, according to the method described in FIG. 5A, resource sensing within the sensing window, and determine the candidate resource set S_B from the data resource pool within the selecting window according to a sensing result within the sensing window, so as to select the first resource used for transmitting data from the candidate resource set S_B.

For another example, the first terminal device determines which resources in the data resource pool within the selecting window have been reserved or occupied by detecting the PSCCH within the sensing window. Resources in the data resource pool which are not reserved or occupied by another terminal may be used as candidate resources for selecting the first resource, and a resource may be selected from these candidate resources as the first resource.

Further, optionally, the first terminal device performs resource sensing, including: the first terminal device performs resource sensing before a starting time point of the first resource. For example, the first terminal device may continuously perform resource sensing before the starting time point of the first resource, and select the first resource in the data resource pool according to a sensing result within the duration of performing resource sensing continuously.

Or, after the first terminal device selects the first resource in the data resource pool, the method further includes: the first terminal device continuously performs resource sensing before the starting time point of the first resource, and determines whether to reselect a resource according to a result of resource sensing. If it is determined not to reselect the resource, the first resource is used for sending data. If it is determined that re-selection of a resource is needed, the reselected resource is used for sending data. Further, if the first terminal determines that it needs to reselect the resource, the first terminal reselects one resource within a resource selecting window as the first resource. Optionally, the first terminal reselects one resource within the resource selecting window as a second resource, wherein the second resource is used for sending resource indication information, and the resource indication information is used for indicating the reselected first resource.

For example, as shown in FIG. 5B, the first terminal device determines which resources in the data resource pool within the selecting window have been reserved or occupied by detecting the PSCCH within the sensing window, and the resources in the data resource pool which are not reserved or occupied by another terminal device may be used as candidate resources for selecting the first resource. The first terminal device selects, at a time point n, one data resource of a time point $n+m_1$, and selects, at a time point n, one resource of a time point $n+m_2$ as a second resource, the second resource is used for sending first indication information, wherein n is a time point when resource selection starts or a time point of data arrival. The first terminal device will continuously perform sensing before the time point $n+m_1$. The first terminal determines whether to send data at the time point $n+m_1$ according to a sensing result within this duration of performing resource sensing continuously. For example, if the first terminal device does not detect that there is a conflict between the data resources selected by another terminal device and the data resources at the time point $n+m_1$ before the time point $n+m_1$, then the first terminal device may send data at the time point $n+m_1$. If the first terminal device detects that there is a conflict between the data resources selected by another terminal device and the resources at the time point $n+m_1$, and a value of a data priority of another terminal device is lower than a value of a data priority of the first terminal device (the lower the value of the priority is, the higher the priority is), then the first terminal device does not send data at the time point $n+m_1$, and the first terminal device may reselect a resource, i.e., reselecting one resource as the first resource for data transmission. If a value of a data priority of another terminal device is higher than the value of the data priority of the first terminal device, then the first resource is the resource of the time point $n+m_1$, and the first terminal device may send data at the time point $n+m_1$. Herein, considering limitation of half-duplex, since the first terminal device needs to send first indication information at the time point $n+m_2$, the first terminal device may not perform resource sensing at the time point $n+m_2$. That is, during the time period from the time point n to the time point $n+m_1$, the first terminal device continuously performs resource sensing, but excluding the time point $n+m_2$ in this time period.

Or, optionally, the first terminal device performs resource sensing, including: the first terminal device performs resource sensing before a starting time point of the second resource. For example, the first terminal device continuously performs resource sensing before the starting time point of the second resource, and selects the first resource in the data resource pool according to a result of the resource sensing within the duration of performing resource sensing continuously.

Or, after the first terminal device selects the first resource in the data resource pool, the method further includes: the first terminal device continuously performs resource sensing before the starting time point of the second resource, and determines whether to reselect a resource according to a result of resource sensing. If it is determined not to reselect the resource, the first resource is used for sending data. If it is determined that re-selection of a resource is needed, the reselected resource is used for sending data.

For example, as shown in FIG. 5B, the first terminal device determines which resources in the data resource pool within the selecting window have been reserved or occupied by detecting the PSCCH within the sensing window, and the resources in the data resource pool which are not reserved or occupied by another terminal device may be used as candidate resources for selecting the first resource. The first terminal device selects one data resource of a time point $n+m_1$ and selects, at a time point n, one resource of a time point $n+m_2$ as a second resource, the second resource is used for sending first indication information, wherein n is a time point when resource selection starts. Further, the first terminal device continuously performs sensing before a starting time point of the second resource, i.e., the time point $n+m_2$. The first terminal determines whether data needs to be sent at the time point $n+m_1$ according to a sensing result within this duration of performing resource sensing continuously. For example, if the first terminal device does not detect that a conflict between the data resources selected by another terminal device and the resources at the time point $n+m_1$ exists before the time point $n+m_2$, then the first resource is the resource of the time point $n+m_1$, and the first terminal device may send the first indication information at the time point $n+m_2$, and send data at the time point $n+m_1$. If the first terminal device detects that there is a conflict between the data resources selected by another terminal device and the resources at the time point $n+m_1$, and a value of a data priority of another terminal device is lower than a value of a data priority of the first terminal device (the lower the value of the priority is, the higher the priority is), then the first terminal device does not send data at the time point $n+m_1$, and the first terminal device may reselect a resource, i.e., reselecting one resource as the first resource for data transmission. If a value of a data priority of another terminal device is higher than the value of the data priority of the first terminal device, then the first resource is the resource of the time point $n+m_1$, and the first terminal device may send data at the time point $n+m_1$.

Or, optionally, in 610, the first terminal device selects the first resource from the data resource pool within the selecting window, including: the first terminal device randomly selects one resource from the data resource pool within the selecting window as the first resource.

Optionally, in an implementation of the present disclosure, the second resource used for sending the first indication information may include one or more resources. Herein, optionally, positions of the multiple resources are different in time domain, and each resource is used for transmitting the first indication information once.

Figure 7:
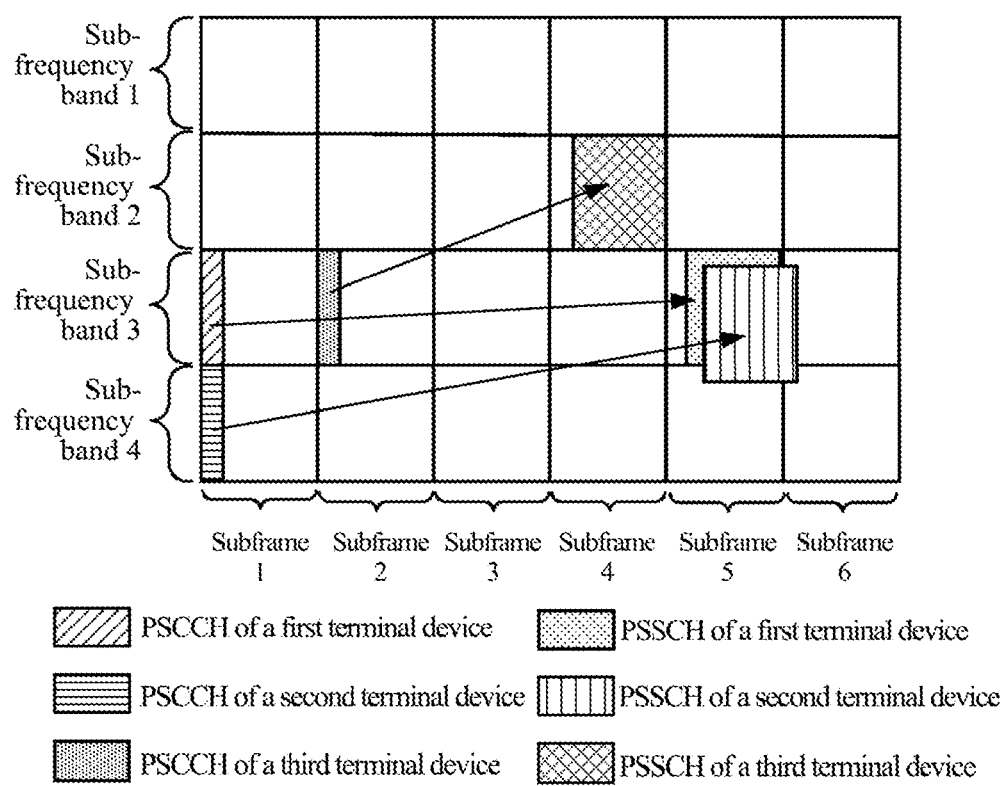
FIG. 7 is a schematic diagram of control channel resources and data channel resources according to an implementation of the present disclosure.

Taking FIG. 7 as an example, it is assumed that both the first terminal device and the second terminal device select resources for transmitting their own PSSCHs on a sub-frequency band 3 of a sub-frame 5, and both the first terminal device and the second terminal device transmit their own PSCCHs on a sub-frame 1. The first terminal device sends its own PSCCH on a sub-frequency band 3 of the subframe 1, wherein an SCI of the first terminal device is carried, and first indication information is included in the SCI and used for indicating a resource selected by the first terminal device on the sub-frequency band 3 of the subframe 5 for sending its PSSCH. The second terminal device sends its own PSCCH on a sub-frequency band 4 of the subframe 1, wherein an SCI of the second terminal device is carried, and second indication information is included in the SCI and used for indicating a resource selected by the second terminal device on the sub-frequency band 3 of the subframe 5 for sending its PSSCH. If an influence of half-duplex is considered, the first terminal device and the second terminal device cannot receive the PSCCH sent by each other. Therefore, in this case, a purpose of avoiding a resource conflict cannot be achieved.

Therefore, in an implementation of the present disclosure, a terminal device may send first indication information on multiple resources in a control resource pool to indicate a resource reserved by itself for transmitting a PSSCH. As shown in FIG. 8, after the first terminal device sends its own PSCCH on a subframe 1, it may also send the PSCCH once on a subframe 2, and SCIs carried in the PSCCH sent twice both include first indication information used for indicating its PSSCH resource. After the second terminal device sends a PSCCH on the subframe 1, it may also send the PSCCH once on a subframe 3, and SCIs carried in the PSCCH sent twice both include second indication information used for indicating its PSSCH resource.

Although the first terminal device and the second terminal device cannot detect the PSCCH sent by the other party on the subframe 1, the first terminal device may detect the second indication information sent by the second terminal device on a sub-frequency band 1 of the subframe 3, and the second terminal device may detect the first indication information sent by the first terminal device on a sub-frequency band 2 of the subframe 2. The first terminal device may know, according to the second indication information sent by the second terminal device, that the second terminal device has reserved a same resource as itself for transmitting the PSSCH of the second terminal device on a fifth subframe. The second terminal device may know, according to the first indication information sent by the first terminal device, that the first terminal device has reserved a same resource as itself for transmitting the PSSCH of the first terminal device on the fifth subframe. Therefore, when there is a resource conflict, the first terminal device and the second terminal device may know the case in advance, and perform a corresponding operation to avoid the conflict.

After the first terminal device and the second terminal device know that there is a resource conflict, the conflict may be avoided by a following method provided by an implementation of the present disclosure.

Optionally, the method further includes: the first terminal device receives second indication information sent by the second terminal device on a third resource, wherein the second indication information indicates a fourth resource used for transmitting data of the second terminal device; if there is a resource conflict between the first resource and the fourth resource, the first terminal device determines whether to send data of the first terminal device on the first resource.

Here, that there is the resource conflict between the first resource and the fourth resource, may include that the first resource partially overlaps or completely overlaps with the fourth resource.

Optionally, the first terminal device may determine whether to send the data of the first terminal device on the first resource according to priority information of the data of the first terminal device and the second terminal device.

For example, the first terminal device may compare a priority of a service to be transmitted by the first terminal device with a priority of a service to be transmitted by the second terminal device based on priority information carried in a PSCCH sent by the second terminal device. A terminal device transmitting a high priority service may use its reserved resource for data transmission, while a terminal device transmitting a low priority service gives up the resource.

Or, optionally, the first terminal device may determine whether to send the data of the first terminal device on the first resource according to an order of the second resource and the third resource in the time domain.

For example, the terminal device which sends a PSCCH earlier may use its reserved resource, and the terminal device which sends a PSCCH later gives up the resource. If the second resource is located before the third resource in the time domain, then the first terminal device sends its own PSSCH on the first resource, while the second terminal device gives up the fourth resource. If the third resource is located before the second resource in the time domain, then the second terminal device sends its own PSSCH on the fourth resource, while the first terminal device gives up the first resource.

It should be noted here that, in order to prevent a case that the two terminal devices cannot receive the PSCCH sent by the other side as shown in FIG. 7 from occurring, when the first terminal device and the second terminal device send a PSCCH multiple times to schedule same PSSCH resources, the resources used for sending the PSCCH multiple times may have a specific pattern in the time domain. For example, if the first terminal device only detects once the PSCCH sent by the second terminal device, then the first terminal device may determine, according to the position of the resource of the PSCCH detected this time and the specific pattern, positions of the resources used by the second terminal device for sending the PSCCH other several times, to determine the one which sends the PSCCH first according to comparison between positions of these resources and the positions of the resources used by itself to send the PSCCH, so as to select or give up the resources among which there is a conflict.

Or, optionally, the first terminal device may determine whether to send the data of the first terminal device on the first resource according to sizes of resources occupied by the first resource and the fourth resource.

For example, when there is a resource conflict between the first resource and the fourth resource, if the first resource is larger than the fourth resource, then the first terminal device may use the first resource to send its PSSCH, while the second terminal device gives up the fourth resource. If the first resource is smaller than the fourth resource, then the second terminal device may use the fourth resource to send its PSSCH, while the first terminal device gives up the first resource.

The first terminal device may compare frequency domain sizes occupied by the first resource and the fourth resource to determine whether to send the data of the first terminal device on the first resource; it may also compare time domain sizes occupied by the first resource and the fourth resource to determine whether to send the data of the first terminal device on the first resource; or, it may compare time-frequency sizes occupied by the first resource and the fourth resource to determine whether to send the data of the first terminal device on the first resource.

Or, optionally, the first terminal device may determine whether to send the data of the first terminal device on the first resource further according to a Modulation and Coding Scheme (MCS) of the data of the first terminal device and the second terminal device or according to other information for transmitting the PSSCH.

The above method may be used for transmission of aperiodic services. For the transmission of aperiodic services, after the terminal device selects the first resource for data to be transmitted, no other resources are reserved. The first indication information only indicates a position of the first resource, but does not indicate other PSSCH resources any more.

In an implementation of the present disclosure, the first terminal device may select a resource based on some time requirements of data transmission, such as a delay requirement or arrival time. The method for a terminal device to select a resource based on the time requirement provided by an implementation of the present disclosure will be described in detail below. It should be understood that the method for selecting a resource described below may be used for the transmission of aperiodic services as described above, and may also be used for transmission of periodic services. Optionally, a resource pool for transmitting the aperiodic services is orthogonal to a resource pool for transmitting the periodic services.

Optionally, in 610, the first terminal device selects the first resource from the data resource pool within the selecting window, including: the first terminal device selects the first resource within a second time range within the selecting window, wherein the second time range is predefined according to a protocol or configured by a network device, or is determined according to a second parameter of data to be transmitted by the first terminal device, wherein the second parameter includes, for example, at least one of following: a delay requirement of the data, a service transmission period, and a maximum number of retransmissions. For example, the second time range is [n+s, n+t], wherein n is a time point when resource selection starts, s is determined according to a maximum time delay configured by the network device for selecting a transmission resource for sending first indication information, and t is determined according to a delay requirement of data to be transmitted, then the first terminal device selects the first resource within the time range [n+s, n+t], and selects the second resource within a time range [n, n+s−1].

Optionally, in 610, the first terminal device selects the first resource from the data resource pool within the selecting window, including: the first terminal device selects the first resource within a time period from a time point $n+T_1$ to a time point $n+T_2$.

Herein, a time point n is a time point when the data of the first terminal device arrives, or a time point when the first terminal device starts to select a resource, wherein $T_1 \geq 0$, $T_1 \leq T_2 \leq T_3$, and $T_3$ is a delay requirement of the data of the first terminal device.

It should be understood that the time point when the first terminal device starts to select the resource may be a time point when the terminal device reports an available resource set (for example, the candidate resource set S_B described in FIG. 5A) based on a request of a higher layer to select a resource for transmitting the PSSCH.

For example, if the delay requirement of data to be transmitted by the first terminal device $T_3=100$ ms, and $T_1=0$, $T_2=T_3=100$ ms, then the first terminal device may select the first resource within a time range of [n, n+100] ms. If the delay requirement of data to be transmitted by the first terminal device, $T_3$, =20 ms, and $T_1=0$, $T_2=T_3=20$ ms, then the first terminal device selects the first resource within a time range of [n, n+20] ms.

For another example, if the delay requirement of data to be transmitted by the first terminal device, $T_3$, =100 ms, and $T_1=10$ ms, $T_2=80$ ms$<T_3$, then the first terminal device may select the first resource within a time range of [n+10, n+80] ms. If the delay requirement of data to be transmitted by the first terminal device, $T_3$, =60 ms, and $T_1=10$ ms, $T_2=T_3=60$ ms, then the first terminal device selects the first resource within a time range of [n+10, n+60] ms.

Here, the number and the size of subframes included in the selecting window of [n+$T_1$, n+$T_2$] ms are not limited. For example, when subcarrier spacing is different, the number and the size of subframes included within [n+$T_1$, n+$T_2$] ms may also be different.

There is a case that if the first terminal device selects, within [n+$T_1$, n+$T_2$] ms, or reserves one resource as the first resource for transmitting data, but when multiple data arrive before a time position of the first resource, then the first terminal device may transmit one of the data on the first resource, and transmit other data in a single transmission mode. The first resource may be reserved by the first terminal device according to a certain period for a subsequent data transmission, and a transmission resource used for a single transmission of data is only used for transmitting data arriving this time, and no periodic reservation is made. Herein, the resource used for a single transmission may be selected by the terminal device in the data resource pool by sensing or randomly selecting.

Optionally, in 610, the first terminal device selects the first resource from the data resource pool within the selecting window, including: the first terminal device selects the first resource within a time period from a time point n+$T_4$ to a time point n+$T_5$.

Herein, a time point n is a time point when the data of the first terminal device arrives, or a time point when the first terminal device starts to select a resource, wherein $T_4 \geqslant 0$, $T_4 \leqslant T_5 \leqslant T_6$, and $T_6$ is a minimum arrival time interval of the data of the first terminal device.

It should be understood that the time point when the first terminal device starts to select the resource may be a time point when the terminal device reports an available resource set (for example, the candidate resource set S_B described in FIG. 5A) based on a request of a higher layer to select a resource for transmitting the PSSCH.

Here, the number and the size of subframes included in the selecting window of [n+$T_4$, n+$T_5$] ms are not limited. For example, when a subcarrier spacing is different, the number and the size of subframes included within [n+$T_4$, n+$T_5$] ms may also be different.

For example, the minimum arrival time interval of a service to be transmitted by the first terminal device, $T_6$, =60 ms, an average arrival time of the service is 100 ms, and an arrival time may vary within a range of [-40, 40] ms. Assuming $T_4=0$, $T_5=T_6=60$ ms, the first terminal device may select the first resource within a time range of [n, n+60] ms, so that a transmission requirement of the service can be satisfied.

However, if the terminal device selects the first resource within the time range of [n, n+60] ms and reserves it according to a period of 60 ms, that is, time positions of n+120 ms, n+180 ms, etc. are reserved, and the service arrival time is n+80 ms, then the service can only be transmitted at the time position of n+120 ms. If a delay requirement of the service is less than 120 ms−80 ms=40 ms, the delay requirement thereof cannot be satisfied when it is transmitted at the time position of n+120 ms.

At this time, the terminal device may send the service in a single transmission mode, for example, it may select, based on a sensing result or randomly within the selecting window, one resource used for transmitting the service without periodically reserving the resource used for transmitting the service.

Or, the terminal device may also avoid this case from happening in another mode. For example, in 610, the first terminal device may select multiple candidate resources from the data resource pool within the selecting window. The first resource is included in the multiple candidate resources. Furthermore, a time interval between two adjacent candidate resources in the time domain is less than or equal to the delay requirement of the data of the first terminal device. At this time, the first indication information is used for indicating the multiple candidate resources.

Optionally, frequency domain sizes occupied by the multiple candidate resources are same, and/or time domain sizes occupied by the multiple candidate resources are same. Furthermore, optionally, among the multiple candidate resources, the time interval between two adjacent candidate resources in the time domain may be configured by the network device for the first terminal device or selected by the first terminal device independently. For example, the terminal device may determine the time interval between two adjacent candidate resources according to a Channel Busy Ratio (CBR) or a Channel Ratio (CR). The number of the multiple candidate resources may also be configured by the network device for the first terminal device, or selected by the first terminal device independently.

In this implementation, since the terminal device has reserved multiple candidate resources, and a time interval between adjacent candidate resources in these multiple candidate resources in the time domain is less than or equal to a delay requirement of data of the first terminal device, then, no matter when data of the terminal device arrives, there are resources which can be used for transmitting the data and satisfy a delay requirement of the data.

Since the first indication information indicates these multiple candidate resources, after detecting the first indication information, another terminal device can know that the first terminal device may perform transmission on one or more of the multiple candidate resources, so as to take some measures to avoid resource conflicts.

Further, optionally, the first terminal device may select these multiple candidate resources within a time period from a time point n+$T_7$ to a time point n+$T_8$. Herein, a time point n is a time point when the data of the first terminal device arrives, or a time point when the first terminal device starts to select a resource, wherein $T_7 \geqslant 0$, $T_7 \leqslant T_8 \leqslant T_9$.

It should be understood that $T_7$ may be, for example, equal to or smaller than a minimum arrival time interval of the data of the first terminal device, and $T_9$ may be, for example, equal to or larger than a maximum arrival time interval of the data of the first terminal device. Preferably, $T_7$ is equal to a minimum arrival time interval of the data of the first terminal device, and $T_9$ is equal to a maximum arrival time interval of the data of the first terminal device.

It should be understood that the time point when the first terminal device starts to select the resource may be a time point when the terminal device reports an available resource set (for example, the candidate resource set S_B described in FIG. 5A) based on a request of a higher layer to select a resource for transmitting the PSSCH.

For example, a minimum arrival time interval of a service to be transmitted by the first terminal device is $T_7$=60 ms, a maximum arrival time interval is $T_9$=140 ms, and a delay requirement of the terminal device is 20 ms. Assuming that $T_8$=$T_9$=140 ms, then the first terminal device may select multiple candidate resources within a time range of [n+60, n+140] ms, and adjacent candidate resources thereof are separated by 20 ms in the time domain, for example, starting positions of the selected multiple candidate resources may include n+60 ms, n+80 ms, n+100 ms, n+120 ms and n+140 ms. In this way, when a service of the first terminal device arrives at any time point within [n+60, n+140] ms, there are resources satisfying a delay requirement for transmitting the service. For example, an arrival time of the service is n+90 ms, then the service may be transmitted on a resource of n+100 ms.

For data aperiodically transmitted, the data transmitted each time is not fixed, for example, an amount of data transmitted each time may be different. Optionally, when the first resource selected by the first terminal device in 610 cannot bear data to be transmitted (for example, the first resource can only transmit 100 bits of data, but the data to be transmitted includes 1000 bits), then the first terminal device may send the data to be transmitted in a single transmission mode; or, the first terminal device may use the first resource to send part of the data to be transmitted, and transmit the remaining data in a single transmission mode. The first resource may be reserved by the first terminal device according to a certain period for a subsequent data transmission, and a transmission resource used for a single transmission of data is only used for transmitting data arriving this time, and no periodic reservation is made. Herein, the resource used by a single transmission may be selected by the terminal device in the data resource pool by sensing or randomly selecting.

With the method described above, when the first terminal device transmits data, various time requirements of data transmission can be satisfied, thus improving data transmission performance.

FIG. 9 is a schematic flowchart of a method for transmitting data in a sidelink according to an implementation of the present disclosure. The method shown in FIG. 9 may be performed by a terminal device. The terminal device may be, for example, the terminal device 20 or the terminal device 30 shown in FIG. 2. As shown in FIG. 9, the method for transmitting data in a sidelink includes: in 910, the first terminal device selects multiple first resources from a data resource pool within a selecting window, wherein the multiple first resources may be used for sending data of the first terminal device.

In 920, the first terminal device selects a second resource used for sending first indication information from a control resource pool within the selecting window.

Herein, the first indication information is used for indicating the multiple first resources, and the multiple first resources and positions of the second resource are different in time domain and/or frequency domain.

The first indication information may be information carried in an SCI, for example.

In 930, the first terminal device sends the first indication information on the second resource, and sends the data of the first terminal device on at least partial first resources of the multiple first resources, wherein the data is sent once on each first resource in the at least partial first resources.

Specifically, the first terminal device selects multiple first resources available for data transmission from a data resource pool, and sends the data of the first terminal device in at least partial first resources of the multiple first resources, wherein the first terminal device will send the data once on each first resource in the at least partial first resources.

An implementation of the present disclosure does not limit the order of performing 910 and 920. 910 may be performed before 920, or 920 may be performed before 910, or 910 and 920 may be performed at the same time.

In a case, there is no corresponding relationship between resources in the data resource pool and resources in the control resource pool. These multiple first resources selected by the first terminal device and a second resource used for sending first indication information may not have a certain specific relationship on a time position or a frequency position. For example, a starting position in the first resource may not be decided by a position of its corresponding second resource. The first terminal device may independently select the second resource and the first resource. The first terminal device may not depend on a position of the second resource when selecting the first resource. Similarly, the terminal device may not depend on a position of the first resource when selecting the second resource. After the first terminal device selects the multiple first resources, information of the multiple first resources is indicated through the first indication information, so that another terminal device which detects the first indication information may know that the first terminal device has reserved these multiple first resources, and thus a resource conflict can be avoided.

Since the first terminal device sends the data on multiple first resources several times respectively, the reliability of data transmission is greatly improved and an influence of half-duplex is avoided. In addition, particularly, a resource conflict during data transmission may be avoided as much as possible. Even if there is a resource conflict on partial first resources of the selected multiple first resources, the data may also be transmitted on other partial first resources on which there is no resource conflict.

Optionally, frequency domain sizes occupied by the multiple first resources are same, and/or time domain sizes occupied by the multiple first resources are same. The number of the multiple first resources may be configured by the network device for the first terminal device, or selected by the first terminal device independently.

In this case, optionally, in 920, the first terminal device selects the second resource used for sending the first indication information from the control resource pool within the selecting window, including: the first terminal device randomly selects the second resource from the control resource pool within the selecting window. Herein, the first terminal device may randomly select one or more resources from the control resource pool within the selecting window as the second resource.

Or, optionally, in 920, the first terminal device selects the second resource used for sending the first indication information from the control resource pool within the selecting window, including: the first terminal device selects the second resource within a first time range within the selecting window, wherein the first time range is predefined by a protocol or configured by a network. Further, the first time range is a time range before a time point at which the first resource is. For example, as shown in FIG. 5B, the first terminal device performs resource selection at a time point n, and selects a resource at a time point n+k1 as the first resource, and the first terminal device selects the second resource within the first time range [n+p, n+q], wherein n is a time point when resource selection starts, and the parameter p or q is predefined by the protocol or configured by the network, for example, p=0 and q=5. Optionally, the parameter q configured by the network is an integer less than n+k1. In this way, the terminal device selects the second resource within the first time range [n+p, n+q], so that the first indication information may be sent in time.

In another case, there is a corresponding relationship between resources in the data resource pool and resources in the control resource pool.

In this case, optionally, in 920, the first terminal device selects the second resource used for sending the first indication information from the control resource pool within the selecting window, including: the first terminal device selects the second resource from multiple resources corresponding to the first resource in the control resource pool.

It should be understood that a corresponding relationship between data resources in the data resource pool and control resources in the control resource pool may be that one data resource corresponds to one control resource, one data resource corresponds to multiple control resources, or multiple data resources correspond to one control resource, and this is not limited here.

After the first terminal device selects the multiple first resources, it may select a second resource used for sending first indication information according to the corresponding relationship between the resources in the data resource pool and the resources in the control resource pool. For example, one resource may be randomly selected as a second resource from multiple control resources respectively corresponding to multiple first resources, and the first indication information may be sent on the second resource to indicate the multiple first resources. For another example, multiple control resources respectively corresponding to multiple first resources may all be taken as a second resource, that is, the second resource includes multiple resources, wherein each resource is used for bearing the first indication information. For another example, a control resource corresponding to a certain specific first resource may be taken as the second resource, and the first indication information may be sent on the second resource to indicate the multiple first resources.

Optionally, among multiple second resources respectively corresponding to multiple first resources, the first indication information sent on each second resource may be used for indicating the multiple first resources; or, the first indication information sent on each second resource is used for indicating the first resource corresponding to the each second resource among the multiple first resources, that is, the first indication information sent on each second resource among the multiple second resources only indicates the first resource corresponding to itself.

The corresponding relationship between the resources in the data resource pool and the resources in the control resource pool may be preconfigured, for example, preset by a protocol; or it may be configured by the network device, and notified to the terminal device through broadcast information, RRC signaling or control signaling.

The selecting window is a time range after a time point when the first terminal device performs a resource selection. The selecting window may, for example, refer to the selecting window shown in FIG. 5A, a data resource pool and a control resource pool may be included within the selecting window. Resources in the data resource pool are used for transmitting a data channel, the first terminal device may select, in the data resource pool, a resource for transmitting its PSSCH; the control resource pool is used for transmitting a control channel, and the first terminal device may select, in the control resource pool, a resource for transmitting its PSCCH.

Optionally, the selecting window may be determined according to a first parameter of data to be transmitted by the first terminal device, wherein the first parameter includes, for example, at least one of following: a delay requirement of the data, a service transmission period, and a maximum number of retransmissions.

Optionally, the second resource is located before the multiple first resources. That is, the multiple first resources and the second resource are time-divided.

Optionally, in 910, the first terminal device selects the multiple first resources from the data resource pool within the selecting window, including: the first terminal device performs resource sensing, and selects the multiple first resources from the data resource pool according to a result of the resource sensing.

For example, the first terminal device may perform, according to the method described in FIG. 5A, resource sensing within the sensing window, and determine a candidate resource set S_B from the data resource pool within the selecting window according to a sensing result within the sensing window, so as to select the multiple first resources which may be used for transmitting data from the candidate resource set S_B.

For another example, the first terminal device determines which resources in the data resource pool within the selecting window have been reserved or occupied by detecting the PSCCH within the sensing window. Resources in the data resource pool which are not reserved or occupied by another terminal may be taken as candidate resources for selecting the first resource, and one resource may be selected from these candidate resources as the first resource.

Optionally, the first terminal device performs resource sensing, including: the first terminal device performs resource sensing before a starting time point of the second resource. For example, the first terminal device continuously performs resource sensing before the starting time point of the second resource, and selects the multiple first resources in the data resource pool according to a sensing result within the duration of performing resource sensing continuously.

Or, after the first terminal device selects the multiple first resources in the data resource pool, the method further includes: the first terminal device continuously performs resource sensing before the starting time point of the second resource, and determines the at least one first resource from the multiple first resources for sending data according to a result of resource sensing.

For example, as shown in FIG. 5B, the first terminal device determines which resources in the data resource pool within the selecting window have been reserved or occupied by detecting the PSCCH within the sensing window. Resources in the data resource pool which are not reserved or occupied by another terminal device may be used as candidate resources for selecting the first resource. The first terminal device selects multiple first resources at a time point n, wherein a starting position of a certain first resource of the multiple first resources is at a time point $n+m_1$, and the first terminal device selects, at a time point n, one resource of a time point $n+m_2$ as a second resource, wherein the second resource is used for sending first indication information, wherein n is a time point when the resource selection starts. Further, the first terminal device continuously performs sensing before a starting time point of the second resource, i.e., the time point $n+m_2$. Taking the first resource of the time point $n+m_1$ as an example, the first terminal device determines whether data needs to be sent at the time point $n+m_1$ according to a sensing result within this duration of performing resource sensing continuously. For example, if the first terminal device does not detect that there is a conflict between a data resource selected by another terminal device and the first resource of the time point $n+m_1$ before the time point $n+m_2$, then the first terminal device may send the first indication information at the time point $n+m_2$, and send data at the time point $n+m_1$. If the first terminal device detects that there is a conflict between the data resource selected by another terminal device and the first resource at the time point $n+m_1$, and a value of a data priority of another terminal device is lower than a value of a data priority of the first terminal device (the lower the value of the priority is, the higher the priority is), then the first terminal device does not send data at the time point $n+m_1$, but may send data on another selected first resource of the multiple first resources; if a value of a data priority of another terminal device is higher than the value of the data priority of the first terminal device, then the first terminal device may send data on the first resource of the time point $n+m_1$. That is to say, among the multiple first resources selected at the time point n, it is determined according to the resource sensing performed before the time point $n+m_2$ that the resource without a resource conflict may be used for data transmission, while it is determined whether the resource with a resource conflict needs to be used for resource data transmission according to the data priority of the first terminal device and/or the data priority of another terminal device having a resource conflict with the first terminal device.

Or, optionally, in 910, the first terminal device selects the multiple first resources from the data resource pool within the selecting window, including: the first terminal device randomly selects multiple resources from the data resource pool within the selecting window as the multiple first resources.

Optionally, in an implementation of the present disclosure, in order to avoid an influence of half-duplex, the second resource used for sending the first indication information may include one or more resources. Herein, optionally, positions of the multiple resources are different in time domain, and each resource is used for transmitting the first indication information once.

After the first terminal device and the second terminal device know that there is a resource conflict, the conflict may be avoided by a following method provided by an implementation of the present disclosure.

Optionally, the method further includes: the first terminal device receives second indication information sent by the second terminal device on a third resource, wherein the second indication information indicates a fourth resource used for transmitting data of the second terminal device; the first terminal device determines at least partial first resources for data transmission in the multiple first resources based on the fourth resource.

Herein, optionally, the at least partial first resources include: a first resource which does not have a resource conflict with the fourth resource; and/or a first resource which has a resource conflict with the fourth resource but satisfies a preset condition.

Here, that there is the resource conflict between the first resource and the fourth resource, may include: the first resource partially overlaps or completely overlaps with the fourth resource.

Optionally, the preset condition includes any one of following: a priority of the data of the first terminal device is higher than a priority of the data of the second terminal device; the second resource is located before the third resource in the time domain; an index of a Modulation and Coding Scheme (MCS) of the data of the first terminal device is greater or less than an index of an MCS of the data of the second terminal device; a size of a resource occupied by the first resource is larger than a size of a resource occupied by the fourth resource.

That is to say, if a part of the first resources in the multiple first resources selected by the terminal device in the selecting window have a conflict with the fourth resource, then the terminal device may not send the data of the first terminal device on these first resources which have a conflict with the fourth resource. Or, the terminal device may determine whether to send the data of the first terminal device on these first resources which have the conflict with the fourth resource according to priority information of the data of the first terminal device and the second terminal device, or according to an order of the second resource and the third resource in the time domain, or according to the size of the resources occupied by the first resource and the fourth resource, or according to the MCSs of the data of the first terminal device and the second terminal device, or according to other information for transmitting a PSSCH.

For those first resources which have no conflict with the fourth resource, the terminal device may normally send the data on these first resources.

The method described above may be used for transmission of aperiodic services. For the transmission of aperiodic services, after the terminal device selects the first resource for data to be transmitted, no other resources are reserved. The first indication information only indicates positions of the multiple first resources, but does not indicate other PSSCH resources any more.

In an implementation of the present disclosure, the first terminal device may select a resource based on some time requirements of data transmission, such as a delay requirement or arrival time. The method for a terminal device to select a resource based on the time requirement provided by an implementation of the present disclosure will be described in detail below. It should be understood that the method for selecting a resource described below may be used for the transmission of aperiodic services as described above, and may also be used for transmission of periodic services. Optionally, a resource pool for transmitting the aperiodic services is orthogonal to a resource pool for transmitting the periodic services.

Optionally, in 910, the first terminal device selects the multiple first resources from the data resource pool within the selecting window, including: the first terminal device selects the multiple first resources within a second time range within the selecting window, wherein the second time range is predefined according to a protocol or configured by a network device, or is determined according to a second parameter of data to be transmitted by the first terminal device, wherein the second parameter includes, for example, at least one of following: a delay requirement of the data, a service transmission period, and a maximum number of retransmissions. For example, the second time range is [n+s, n+t], wherein n is a time point when resource selection starts, s is determined according to a maximum time delay configured by a network device for selecting a transmission resource for sending first indication information, and t is determined according to a delay requirement of data to be transmitted, then the first terminal device selects the multiple first resources within the time range [n+s, n+t], and selects the second resource within a time range [n, n+s−1].

Optionally, in 910, the first terminal device selects the multiple first resources from the data resource pool within the selecting window, including: the first terminal device selects the multiple first resources within a time period from a time point $n+T_1$ to a time point $n+T_2$. Herein, a time point n is a time point when the data of the first terminal device arrives, or a time point when the first terminal device starts to select a resource, wherein $T_1 \geqslant 0$, $T_1 \leqslant T_2 \leqslant T_3$, and $T_3$ is a delay requirement of the data of the first terminal device.

For example, if the delay requirement of data to be transmitted by the first terminal device $T_3=100$ ms, and $T_1=0$, $T_2=T_3=100$ ms, then the first terminal device may select the multiple first resources within a time range of [n, n+100] ms.

Here, the number and the size of subframes included in the selecting window of $[n+T_1, n+T_2]$ ms are not limited. For example, when subcarrier spacing is different, the number and the size of subframes included within $[n+T_1, n+T_2]$ ms may also be different.

There is a case where if the first terminal device selects or reserves multiple first resources within $[n+T_1, n+T_2]$ ms, and determines to transmit data on at least partial resources of the multiple first resources. However, if multiple data arrive before time positions of multiple first resources, then the first terminal device may transmit one of the data on at least partial first resources, wherein the data is transmitted once on each resource, and the remaining other data is transmitted in a single transmission mode. Each first resource of the multiple first resources selected by the first terminal device in the selecting window may be reserved by the first terminal device according to a certain period for a subsequent data transmission, and a transmission resource used for a single transmission of data is only used for transmitting data arriving this time, and no periodic reservation is made.

Optionally, in 910, the first terminal device selects the multiple first resources from the data resource pool within the selecting window, including: the first terminal device selects the multiple first resources within a time period from a time point $n+T_4$ to a time point $n+T_5$. Herein, a time point n is a time point when the data of the first terminal device arrives, or a time point when the first terminal device starts to select a resource, wherein $T_4 \geqslant 0$, $T_4 \leqslant T_5 \leqslant T_6$, and $T_6$ is a minimum arrival time interval of the data of the first terminal device.

Here, the number and the size of subframes included in the selecting window of $[n+T_4, n+T_5]$ ms are not limited. For example, when a subcarrier spacing is different, the number and the size of subframes included within $[n+T_4, n+T_5]$ ms may also be different.

For example, the minimum arrival time interval of a service to be transmitted by the first terminal device is $T_6=60$ ms. Assuming $T_4=0$ and $T_5=T_6=60$ ms, the first terminal device may select the multiple first resources within a time range of [n, n+60] ms, so as to satisfy a transmission requirement of the service.

Optionally, in 910, the first terminal device selects the multiple first resources from the data resource pool within the selecting window, including: the first terminal device selects the multiple first resources within a time period from a time point $n+T_7$ to a time point $n+T_8$. Herein, a time point n is a time point when the data of the first terminal device arrives, or a time point when the first terminal device starts to select a resource, wherein $T_7 \geqslant 0$, $T_7 \leqslant T_8 \leqslant T_9$, and a time interval between two adjacent first resources in the time domain is less than or equal to a delay requirement of the data of the first terminal device.

$T_7$ may be, for example, equal to or smaller than a minimum arrival time interval of the data of the first terminal device, and $T_9$ may be, for example, equal to or larger than a maximum arrival time interval of the data of the first terminal device.

Since a time interval between adjacent first resources in the time domain among these multiple first resources is less than or equal to the delay requirement of the data of the first terminal device, then, no matter when data of the terminal device arrives, there are first resources which can be used for transmitting the data and satisfy the delay requirement of the data.

Optionally, in 910, the first terminal device selects the multiple first resources from the data resource pool within the selecting window, including: the first terminal device selects K groups of candidate resources from the data resource pool within the selecting window, wherein the multiple first resources are one group of the candidate resources in the K groups of candidate resources, wherein a time interval between first resources in the two groups of candidate resources adjacent in the time domain is less than or equal to the delay requirement of the data of the first terminal device. The first indication information is used for indicating the K groups of candidate resources, wherein K is a positive integer greater than 1.

Optionally, each group of the K groups of candidate resources occupies a same size of frequency domain and/or a same size of time domain. For example, the j-th first resource in the i-th group of candidate resources has a same size of frequency domain and/or a same size of time domain as the j-th first resource in the i-th group of candidate resources, wherein $0 \leqslant i \leqslant K-1$, $j \geqslant 1$ and j is less than or equal to the number of the multiple first resources selected by the terminal device within the selecting window.

Furthermore, optionally, in the K groups of candidate resources, a time interval between first resources in the two groups of candidate resources adjacent in the time domain may be configured by the network device for the first terminal device or selected by the first terminal device independently. For example, it may be determined by the terminal device according to a CBR or a CR. A value of K may also be configured by the network device for the first terminal device, or selected by the first terminal device independently.

Since the terminal device has reserved K groups of candidate resources, and the time interval between the first resources in the two groups of candidate resources adjacent in time domain is less than or equal to the delay requirement of the data of the first terminal device, then, no matter when data of the terminal device arrives, there is one group of candidate resources which include the first resource that can be used for transmitting the data and satisfy the delay requirement of the data.

Further, optionally, the first terminal device may select the K groups of candidate resources within a time period from a time point $n+T_7$ to a time point $n+T_8$, wherein, a time point n is a time point when the data of the first terminal device arrives, or a time point when the first terminal device starts to select a resource, wherein $T_7 \geqslant 0$, $T_7 \leqslant T_8 \leqslant T_9$.

It should be understood that $T_7$ may be, for example, equal to or smaller than a minimum arrival time interval of the data of the first terminal device, and $T_9$ may be, for example, equal to or larger than a maximum arrival time interval of the data of the first terminal device. Preferably, $T_7$ is equal to a minimum arrival time interval of the data of the first terminal device, and $T_9$ is equal to a maximum arrival time interval of the data of the first terminal device.

It should also be understood that the time point when the first terminal device starts to select the resource described above may be a time point when the terminal device reports an available resource set (for example, the candidate resource set S_B described in FIG. 5A) based on a request of a higher layer to select a resource for transmitting the PSSCH.

For data aperiodically transmitted, the data transmitted each time is not fixed, for example, an amount of data transmitted each time may be different. Optionally, if none of the multiple first resources selected by the first terminal device in 910 can bear data to be transmitted (for example, each first resource can only transmit 100 bits of data, but the data to be transmitted includes 1000 bits), then the first terminal device may send the data to be transmitted in a single transmission mode; or, the first terminal device may use the multiple first resources to send part of the data to be transmitted, and transmit the remaining data in a single transmission mode. The multiple first resources may be reserved by the first terminal device according to a certain period for a subsequent data transmission, and a transmission resource used for a single transmission of data is only used for transmitting data arriving this time, and no periodic reservation is made. Herein, the resource used by a single transmission may be selected by the terminal device in the data resource pool by sensing or randomly selecting.

For the specific details and examples in various implementations related to FIG. 9, please refer to the specific descriptions in various implementations related to FIG. 9, which will not be repeated here for brevity.

It should be noted that, on the premise of no conflict, various implementations described in the present disclosure and/or the technical features in various implementations may be arbitrarily combined with each other, and the technical solutions obtained after combination should also fall into the protection scope of the present disclosure.

It should be understood that in various implementations described in the present disclosure, the terminal device performs resource selection, transmission of the PSCCH and the PSSCH, etc., which are all described in subframes or milliseconds as time units, but are not limited to this. The terminal device may also perform various operations in implementations of the present disclosure based on other time units such as time slots.

It should be understood that in various implementations of the present disclosure, sequence numbers of the various processes do not imply an order of execution of the various processes, the order of execution of the various processes should be determined by their functions and internal logics, and should not constitute any limitation on implementation processes of implementations of the present disclosure.

A method for transmitting data according to an implementation of the present disclosure has been described in detail above. An apparatus according to implementations of the present disclosure will be described below with reference to FIGS. 8 to 10, and technical features described in the method implementations are applicable to following apparatus implementations.

Figure 10:
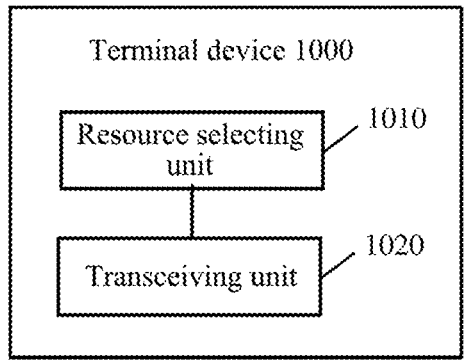
FIG. 10 is a schematic block diagram of a terminal device according to an implementation of the present disclosure.

FIG. 10 is a schematic block diagram of a terminal device 1000 according to an implementation of the present disclosure. As shown in FIG. 10, the terminal device 1000 includes a resource selecting unit 1010 and a transceiving unit 1020.

Wherein, the resource selecting unit 1010 is configured to select a first resource from a data resource pool within a selecting window, wherein the first resource is used for sending data of the first terminal device. The resource selecting unit 1010 is further configured to select a second resource used for sending first indication information from a control resource pool within the selecting window, wherein the first indication information is used for indicating the first resource, and positions of the first resource and the second resource are different in time domain and/or frequency domain. The transceiving unit 1020 is configured to send the first indication information on the second resource, and send the data of the first terminal device on the first resource.

Therefore, when a service of a terminal device does not have periodicity, the terminal device sends, before a data transmission resource used for sending data, indication information indicating the data transmission resource, so that another terminal device can know that the terminal device has reserved the data transmission resource, thus avoiding a resource conflict occurring during data transmission as much as possible.

Optionally, the second resource is located before the first resource.

Optionally, the first indication information is carried in Sidelink Control Information (SCI), or the first indication information is a preamble sequence.

Optionally, the first terminal device further includes a sensing unit, wherein the sensing unit is configured to perform resource sensing; wherein, the resource selecting unit 1010 is specifically configured to select the first resource in the data resource pool according to a result of the resource sensing.

Optionally, the sensing unit is specifically configured to perform resource sensing before a starting time point of the second resource; or, perform resource sensing before a starting time point of the first resource.

Optionally, the resource selecting unit 1010 is specifically configured to randomly select a resource from the data resource pool within the selecting window as the first resource.

Optionally, the resource selecting unit 1010 is specifically configured to randomly select the second resource from the control resource pool within the selecting window.

Optionally, there is a corresponding relationship between resources in the data resource pool and resources in the control resource pool, and the resource selecting unit 1010 is specifically configured to select the second resource from at least one resource corresponding to the first resource in the control resource pool.

Optionally, the second resource includes multiple resources, wherein positions of the multiple resources in the time domain are different, wherein each resource is used for transmitting the first indication information once.

Optionally, the first terminal device further includes a processing unit, wherein the transceiver unit is further configured to receive second indication information sent by a second terminal device on a third resource, wherein the second indication information indicates a fourth resource used for transmitting data of the second terminal device; the processing unit is configured to determine whether to send the data of the first terminal device on the first resource if there is a resource conflict between the first resource and the fourth resource.

Optionally, the processing unit is specifically configured to judge whether to send the data of the first terminal device on the first resource according to priority information of the data of the first terminal device and the second terminal device; or, determine whether to send the data of the first terminal device on the first resource according to an order of the second resource and the third resource in the time domain; or, determine whether to send the data of the first terminal device on the first resource according to a Modulation and Coding Scheme (MCS) of the data of the first terminal device and the second terminal device; or, determine whether to send the data of the first terminal device on the first resource according to sizes of resources occupied by the first resource and the fourth resource.

Optionally, the resource selecting unit 1010 is specifically configured to select the first resource within a time period from a time point $n+T_1$ to a time point $n+T_2$, wherein, a time point n is a time point when the data of the first terminal device arrives, or a time point when the first terminal device starts to select a resource, wherein $T_1 \geq 0$, $T_1 \leq T_2 \leq T_3$, and $T_3$ is a delay requirement of the data of the first terminal device.

Optionally, the resource selecting unit 1010 is specifically configured to select the first resource within a time period from a time point $n+T_4$ to a time point $n+T_5$, wherein, a time point n is a time point when the data of the first terminal device arrives, or a time point when the first terminal device starts to select a resource, wherein $T_4 \geq 0$, $T_4 \leq T_5 \leq T_6$, and $T_6$ is a minimum arrival time interval of the data of the first terminal device.

Optionally, the resource selecting unit 1010 is specifically configured to select multiple candidate resources from the data resource pool within the selecting window, wherein the multiple candidate resources include the first resource, wherein a time interval between two candidate resources adjacent in the time domain is less than or equal to the delay requirement of the data of the first terminal device; wherein the first indication information is used for indicating the multiple candidate resources.

Optionally, the resource selecting unit 1010 is specifically configured to select the multiple candidate resources within a time period from a time point $n+T_7$ to a time point $n+T_8$, wherein, a time point n is a time point when the data of the first terminal device arrives, or a time point when the first terminal device starts to select a resource, wherein $T_7 \geq 0$, $T_7 \leq T_8 \leq T_9$, and $T_9$ is a maximum arrival time interval of the data of the first terminal device.

Optionally, $T_7$ is the minimum arrival time interval of the data of the first terminal device.

It should be understood that the terminal device 1000 may perform corresponding operations performed by the terminal device in the above method 600, and this will not be repeated herein for the sake of brevity.

Figure 11:
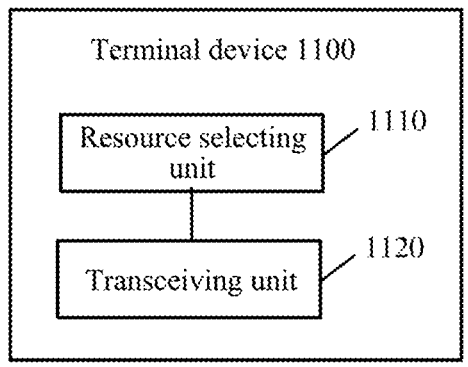
FIG. 11 is a schematic block diagram of a terminal device according to another implementation of the present disclosure.

FIG. 11 is a schematic block diagram of a terminal device 1100 according to an implementation of the present disclosure. As shown in FIG. 11, the terminal device 1100 includes a resource selecting unit 1110 and a transceiving unit 1120. Wherein, the resource selecting unit 1110 is configured to select multiple first resources from a data resource pool within a selecting window, the multiple first resources may be used for sending data of the first terminal device. The resource selecting unit 1110 is further configured to select a second resource used for sending first indication information from a control resource pool within the selecting window, wherein the first indication information is used for indicating the multiple first resources, and positions of the multiple first resources and the second resource are different in time domain and/or frequency domain. The transceiving unit 1120 is configured to send the first indication information on the second resource, and send the data of the first terminal device on at least partial first resources of the multiple first resources, wherein the data is sent once on each first resource in the at least partial first resources.

Therefore, the terminal device sends, before a data transmission resource used for sending data, indication information indicating the data transmission resource, so that another terminal device can know that the terminal device has reserved the data transmission resource. Since the terminal device sends the data on multiple resources several times respectively, reliability of data transmission is thus improved and an influence of half-duplex is avoided. In addition, a resource conflict during data transmission may particularly be avoided as much as possible. Even if there is a resource conflict on partial resources of the selected multiple resources, the data may also be transmitted on other partial resources on which there is no resource conflict.

Optionally, the second resource is located before the multiple first resources.

Optionally, the first indication information is carried in SCI.

Optionally, the first terminal device further includes a sensing unit, wherein the sensing unit is configured to perform resource sensing; wherein, the resource selecting unit 1110 is specifically configured to select the multiple first resources in the data resource pool according to a result of the resource sensing.

Optionally, the sensing unit is specifically configured to perform resource sensing before a starting time point of the second resource.

Optionally, the resource selecting unit 1110 is specifically configured to randomly select multiple resources from the data resource pool within the selecting window as the multiple first resources.

Optionally, the resource selecting unit 1110 is specifically configured to randomly select the second resource from the control resource pool within the selecting window.

Optionally, there is a corresponding relationship between resources in the data resource pool and resources in the control resource pool, wherein the resource selecting unit 1110 is specifically configured to select the second resource from multiple resources corresponding to the multiple first resources in the control resource pool.

Optionally, the second resource includes multiple resources, wherein positions of the multiple resources are different in the time domain, wherein each resource is used for transmitting the first indication information once.

Optionally, the first terminal device further includes a processing unit, wherein the transceiving unit 1120 is configured to receive second indication information sent by a second terminal device on a third resource, wherein the second indication information indicates a fourth resource used for transmitting data of the second terminal device; the processing unit is configured to determine the at least partial first resources in the multiple first resources based on the fourth resource.

Optionally, the at least partial first resources include: a first resource which does not have a resource conflict with the fourth resource; and/or a first resource which has a resource conflict with the fourth resource but satisfies a preset condition.

Optionally, the preset condition includes any one of following: a priority of the data of the first terminal device is higher than a priority of the data of the second terminal device; the second resource is located before the third resource in the time domain; an index of a Modulation and Coding Scheme (MCS) of the data of the first terminal device is greater or less than an index of an MCS of the data of the second terminal device; a size of a resource occupied by the first resource is larger than a size of a resource occupied by the fourth resource.

Optionally, the resource selecting unit 1110 is specifically configured to select the multiple first resources within a time period from a time point n+$T_1$ to a time point n+$T_2$, wherein, a time point n is a time point when the data of the first terminal device arrives, or a time point when the first terminal device starts to select a resource, wherein $T_1 \geqslant 0$, $T_1 \leqslant T_2 \leqslant T_3$, and $T_3$ is a delay requirement of the data of the first terminal device.

Optionally, the resource selecting unit 1110 is specifically configured to select the multiple first resources within a time period from a time point n+$T_4$ to a time point n+$T_5$, wherein, a time point n is a time point when the data of the first terminal device arrives, or a time point when the first terminal device starts to select a resource, wherein $T_4 \geqslant 0$, $T_4 \leqslant T_5 \leqslant T_6$, and $T_6$ is a minimum arrival time interval of the data of the first terminal device.

Optionally, the resource selecting unit 1110 is specifically configured to select the multiple first resources within a time period from a time point n+$T_7$ to a time point n+$T_8$, wherein, a time point n is a time point when the data of the first terminal device arrives, or a time point when the first terminal device starts to select a resource, wherein $T_7 \geqslant 0$, $T_7 \leqslant T_8 \leqslant T_9$, and $T_9$ is a maximum arrival time interval of the data of the first terminal device, and a time interval between two first resources adjacent in the time domain is less than or equal to the delay requirement of the data of the first terminal device.

Optionally, the resource selecting unit 1110 is specifically configured to select K groups of candidate resources from the data resource pool within the selecting window, wherein the multiple first resources are one group of the K groups of candidate resources, wherein a time interval between first resources of the two groups of candidate resources adjacent in time domain is less than or equal to the delay requirement of the data of the first terminal device; wherein the first indication information is used for indicating the K groups of candidate resources, and K is a positive integer greater than 1.

Optionally, the resource selecting unit 1110 is specifically configured to select, by the first terminal device, the K groups of candidate resources within a time period from a time point n+$T_7$ to a time point n+$T_8$, wherein, a time point n is a time point when the data of the first terminal device arrives, or a time point when the first terminal device starts to select a resource, wherein $T_7 \geqslant 0$, $T_7 \leqslant T_8 \leqslant T_9$, and $T_9$ is a maximum arrival time interval of the data of the first terminal device.

Optionally, $T_7$ is the minimum arrival time interval of the data of the first terminal device.

Figure 12:
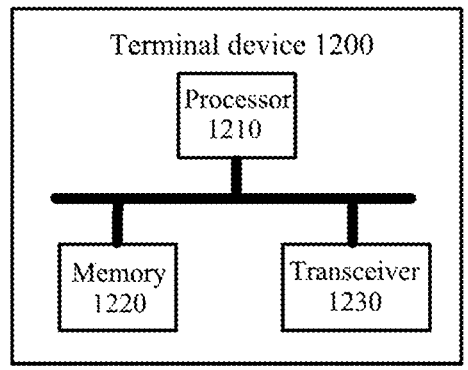
FIG. 12 is a schematic diagram of structure of a terminal device according to an implementation of the present disclosure.

FIG. 12 is a schematic diagram of structure of a terminal device 1200 according to an implementation of the present disclosure. The terminal device 1200 shown in FIG. 12 includes a processor 1210, wherein the processor 1210 may call and run a computer program from a memory to implement the corresponding flows implemented by the terminal device in various methods of implementations of the present disclosure, and this will not be repeated herein for the sake of brevity.

Optionally, as shown in FIG. 12, the terminal device 1200 may further include a memory 1220. Herein, the processor 1210 may call and run a computer program from the memory 1220 to implement the method in an implementation of the present disclosure.

The memory 1220 may be a separate device independent of the processor 1210 or may be integrated in the processor 1210.

Optionally, as shown in FIG. 12, the terminal device 1200 may further include a transceiver 1230, and the processor 1210 may control the transceiver 1230 to communicate with other devices. Specifically, the transceiver 630 may send information or data to other devices or receive information or data sent by other devices.

The transceiver 1230 may include a transmitter and a receiver. The transceiver 1230 may further include antennas, and the number of antennas may be one or more.

Figure 13:
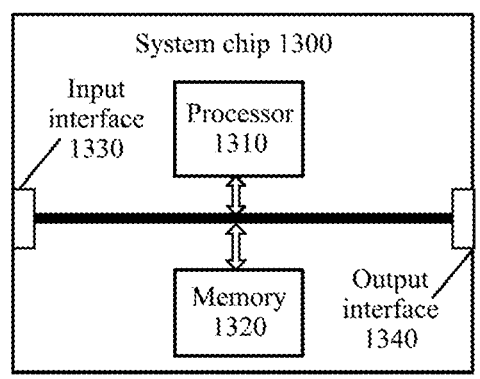
FIG. 13 is a schematic diagram of structure of a chip according to an implementation of the present disclosure.

FIG. 13 is a schematic diagram of structure of a chip according to an implementation of the present disclosure. A chip 1300 shown in FIG. 13 includes a processor 1310. The processor 1310 may call and run a computer program from a memory to implement the method in an implementation of the present disclosure. The chip may be applied in a terminal device of an implementation of the present disclosure, and the chip may implement corresponding flows implemented by the terminal device in various methods of implementations of the present disclosure, and this will not be repeated here for brevity.

Optionally, as shown in FIG. 13, the chip 1300 may further include a memory 1320. Herein, the processor 1310 may call and run a computer program from the memory 1320 to implement the method in an implementation of the present disclosure.

The memory 1320 may be a separate device independent of the processor 1310 or may be integrated in the processor 1310.

Optionally, the chip 1300 may further include an input interface 1330. The processor 1310 may control the input interface 1330 to communicate with other devices or chips. Specifically, the processor 710 may acquire information or data sent by other devices or chips.

Optionally, the chip 1300 may further include an output interface 1340. The processor 1310 may control the output interface 1340 to communicate with other devices or chips. Specifically, the processor 710 may output information or data to other devices or chips.

It should be understood that the chip mentioned in an implementation of the present disclosure may be referred to as a system-level chip, a system chip, a chip system or a system-on-chip, etc.

It should be understood that, the processor in an implementation of the present disclosure may be an integrated circuit chip having a signal processing capability. In an implementation process, the steps of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in an implementation of this application. The general purpose processor may be a microprocessor, or the processor may also be any conventional processor or the like. The steps of the method disclosed with reference to an implementation of this application may be directly implemented by a hardware decoding processor, or may be implemented by a combination of hardware and software modules in the decoding processor.

The software modules may be located in a memory medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memories in the systems and methods described in this specification are intended to include, but are not limited to, these and any memory of another proper type.

It should be understood that, the above memory is an example for illustration but should not be construed as a limitation. For example, the memory in an implementation of the present disclosure may also be a static RAM (SRAM), a dynamic RAM (DRAM), a Synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in implementations of the present disclosure are intended to include, but are not limited to, these and any other suitable types of memories.

An implementation of the present disclosure further provides a computer readable storage medium configured to store a computer program. The computer readable storage medium may be applied in a terminal device of an implementation of the present disclosure, and the computer program enables a computer to perform corresponding flows implemented by the terminal device in various methods of implementations of the present disclosure, and this will not be repeated here for brevity.

An implementation of the present disclosure also provides a computer program product, including computer program instructions. The computer program product may be applied to a terminal device of an implementation of the present disclosure, and the computer program instructions enable a computer to perform corresponding flows implemented by a terminal device in various methods of implementations of the present disclosure, and this will not be repeated here for brevity.

An implementation of the present disclosure also provides a computer program. The computer program may be applied to a terminal device of an implementation of the present disclosure. When the computer program is run on a computer, the computer is enabled to perform corresponding flows implemented by the terminal device in various methods of implementations of the present disclosure, and this will not be repeated here for brevity.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

It should further be understood that in an implementation of the present disclosure, "B corresponding to A" represents that B is associated with A, and B may be determined according to A. However, it should be further understood that determining B according to A does not mean that B is determined according to A only, but B may also be determined according to A and/or other information.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly learn that for convenience and conciseness of description, the specific working processes of systems, apparatuses and units described above may refer to the corresponding processes in the method implementations, and this will not be repeated here.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection of apparatuses or units through some interfaces, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a memory medium, including a number of instructions for causing a computer device (which may be a personal computer, a server, or a network device and the like) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for data transmission in a sidelink, comprising:
   selecting, by a first terminal device, a first resource from a data resource pool within a selecting window, wherein the first resource is configured to send data of the first terminal device;
   selecting, by the first terminal device, a second resource configured to send first indication information from a control resource pool within the selecting window, wherein the first indication information is configured to indicate the first resource, and positions of the first resource and the second resource are different in time domain and/or frequency domain;
   sending, by the first terminal device, the first indication information on the second resource, and sending the data of the first terminal device on the first resource,
   receiving, by the first terminal device, second indication information sent by a second terminal device on a third resource, wherein the second indication information indicates a fourth resource configured to transmit data of the second terminal device; and
   determining, by the first terminal device, whether to send the data of the first terminal device on the first resource when there is a resource conflict between the first resource and the fourth resource,
   wherein determining, by the first terminal device, whether to send the data of the first terminal device on the first resource, comprises:
      determining, by the first terminal device, whether to send the data of the first terminal device on the first resource according to priority information of the data of the first terminal device and the second terminal device,
   wherein there is a corresponding relationship between resources in the data resource pool and resources in the control resource pool, wherein, selecting, by the first terminal device, the second resource configured to send the first indication information from the control resource pool within the selecting window, comprises:
      selecting, by the first terminal device, the second resource from at least one resource corresponding to the first resource in the control resource pool,
   wherein that there is the resource conflict between the first resource and the fourth resource comprises that the first resource partially overlaps or completely overlaps with the fourth resource, and
   wherein selecting, by the first terminal device, the first resource from the data resource pool within the selecting window, comprises:
      selecting, by the first terminal device, the first resource within a time period from a time point $n+T_1$ to a time point $n+T_2$, wherein, a time point n is a time point when the data of the first terminal device arrives, or a time point when the first terminal device starts to select a resource, and wherein $T_1 \geq 0$, $T_1 \leq T_2 \leq T_3$, and $T_3$ is a delay requirement of the data of the first terminal device.

2. The method of claim 1, wherein the first indication information is carried in Sidelink Control Information (SCI), or the first indication information is a preamble sequence.

3. The method of claim 1, wherein selecting, by the first terminal device, the first resource from the data resource pool within the selecting window, comprises:
   performing, by the first terminal device, resource sensing; and
   selecting, by the first terminal device, the first resource in the data resource pool according to a result of the resource sensing.

4. The method of claim 3, wherein performing, by the first terminal device, resource sensing, comprises:
   performing, by the first terminal device, the resource sensing before a starting time point of the second resource.

5. The method of claim 1, wherein selecting, by the first terminal device, the first resource from the data resource pool within the selecting window, comprises:
   selecting, by the first terminal device, a plurality of candidate resources from the data resource pool within the selecting window, wherein the plurality of candidate resources comprise the first resource, and wherein a time interval between two candidate resources adjacent in the time domain is less than or equal to the delay requirement of the data of the first terminal device.

6. A terminal device, being a first terminal device, wherein the first terminal device comprises: a processor and a transceiver,
   the processor is configured to select a first resource from a data resource pool within a selecting window, wherein the first resource is configured to send data of the first terminal device;
   the processor is further configured to select a second resource configured to send first indication information from a control resource pool within the selecting window, wherein the first indication information is configured to indicate the first resource, and positions of the first resource and the second resource are different in time domain and/or frequency domain; and
   the transceiver is configured to send the first indication information on the second resource, and send the data of the first terminal device on the first resource,
   wherein the transceiver is configured to receive second indication information sent by a second terminal device on a third resource, wherein the second indication information indicates a fourth resource configured to transmit data of the second terminal device;
   wherein the processor is configured to determine whether to send the data of the first terminal device on the first resource when there is a resource conflict between the first resource and the fourth resource, wherein the processor is specifically configured to:
determine whether to send the data of the first terminal device on the first resource according to priority information of the data of the first terminal device and the second terminal device,
wherein there is a corresponding relationship between resources in the data resource pool and resources in the control resource pool, wherein, the processor is specifically configured to:
select the second resource from at least one resource corresponding to the first resource in the control resource pool,
wherein that there is the resource conflict between the first resource and the fourth resource comprises that the first resource partially overlaps or completely overlaps with the fourth resource, and
wherein the processor is specifically configured to:
select the first resource within a time period from a time point $n+T_1$ to a time point $n+T_2$, wherein, a time point n is a time point when the data of the first terminal device arrives, or a time point when the first terminal device starts to select a resource, and wherein $T_1 \geq 0$, $T_1 \leq T_2 \leq T_3$, and $T_3$ is a delay requirement of the data of the first terminal device.

7. The terminal device of claim 6, wherein the first indication information is carried in Sidelink Control Information (SCI), or the first indication information is a preamble sequence.

8. The terminal device of claim 6, wherein the processor is further configured to: perform resource sensing; and
select the first resource in the data resource pool according to a result of the resource sensing.

9. The terminal device of claim 8, wherein the processor is specifically configured to:
perform the resource sensing before a starting time point of the second resource.

10. The terminal device of claim 6, wherein the processor is specifically configured to:
select a plurality of candidate resources from the data resource pool within the selecting window, wherein the plurality of candidate resources comprise the first resource, and wherein a time interval between two candidate resources adjacent in the time domain is less than or equal to the delay requirement of the data of the first terminal device.

* * * * *